Figure 1:
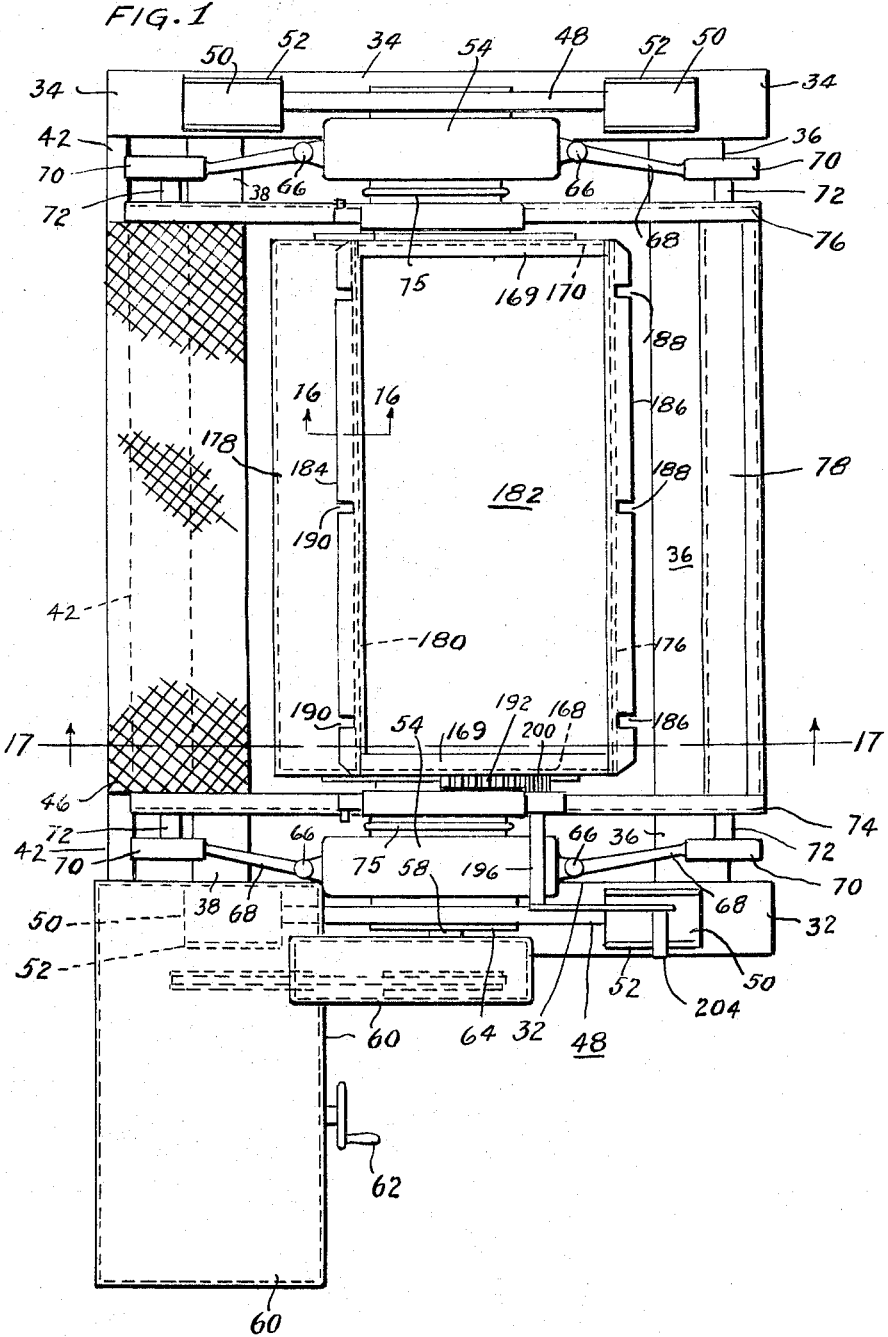

Oct. 4, 1966   F. W. PORTER   3,276,169
VIBRATING EQUIPMENT
Original Filed Feb. 9, 1960   9 Sheets-Sheet 1

INVENTOR
FRANK W. PORTER
BY Rey Eilers
ATT'Y.

Oct. 4, 1966   F. W. PORTER   3,276,169
VIBRATING EQUIPMENT
Original Filed Feb. 9, 1960   9 Sheets-Sheet 2
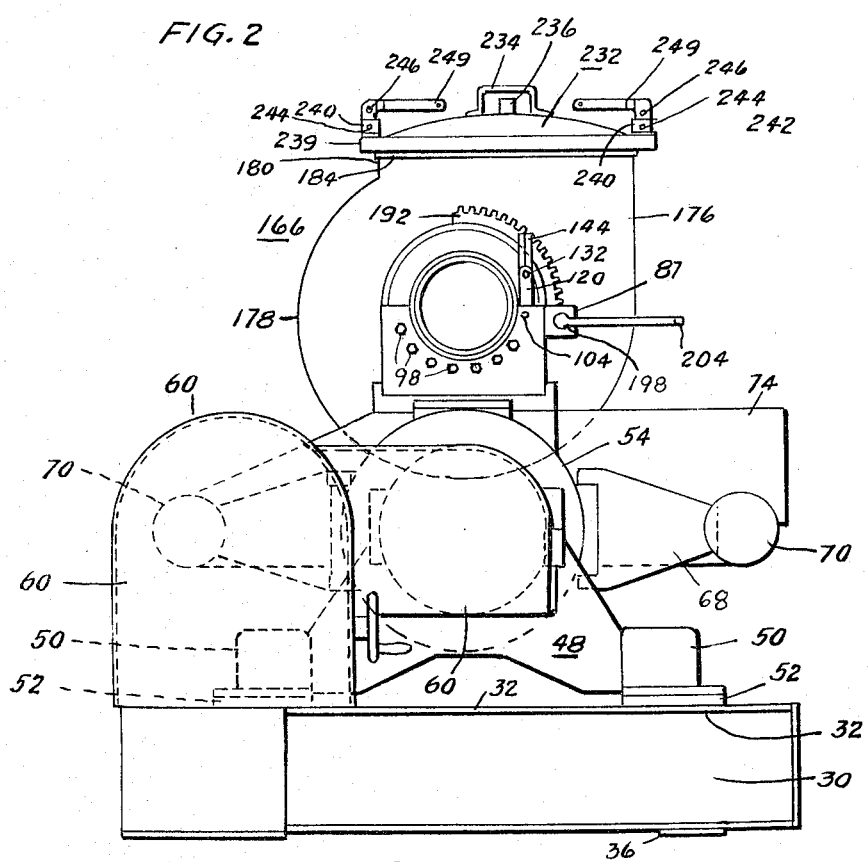
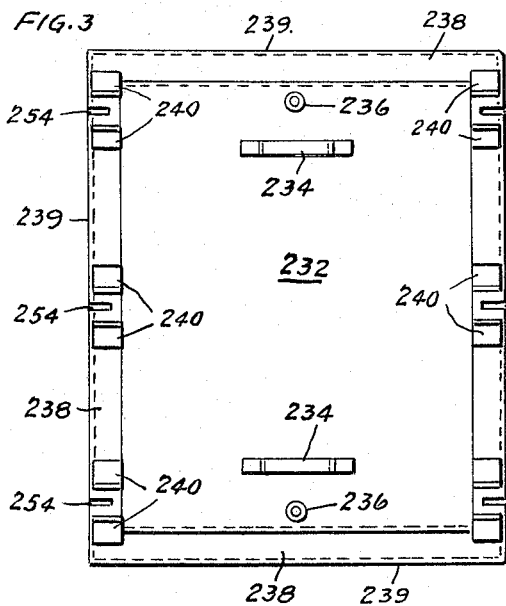
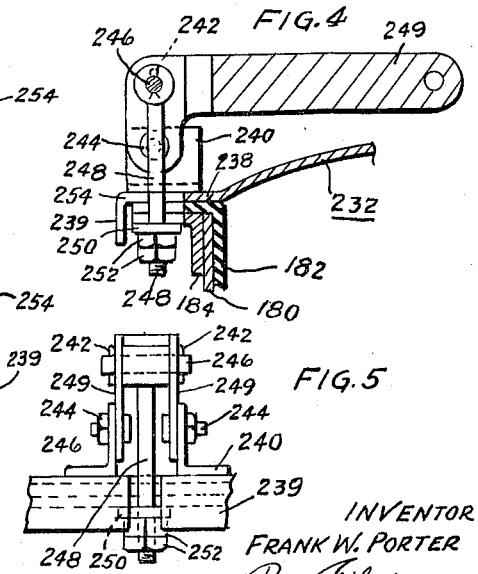
INVENTOR
FRANK W. PORTER Oct. 4, 1966 F. W. PORTER 3,276,169
VIBRATING EQUIPMENT
Original Filed Feb. 9, 1960 9 Sheets-Sheet 3
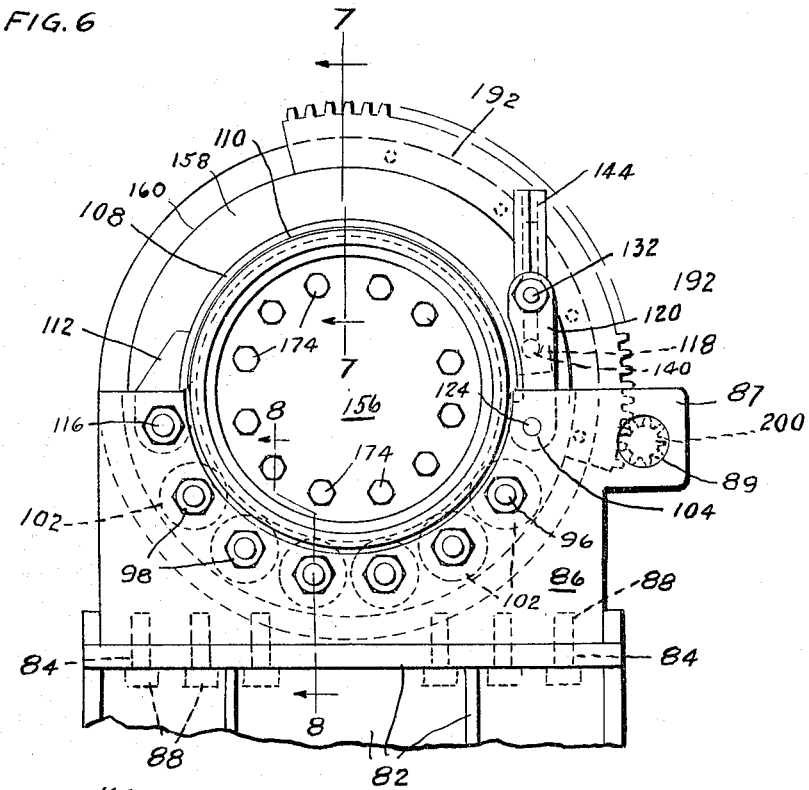
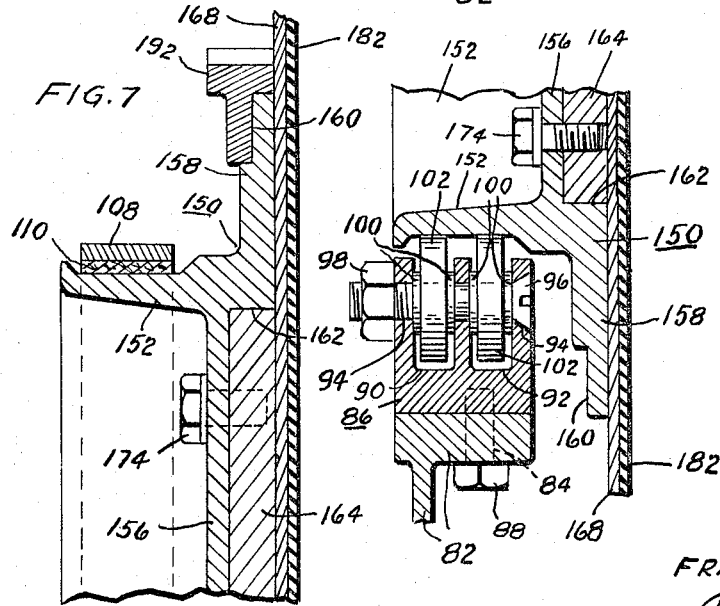
INVENTOR
FRANK W. PORTER
BY Rey Eilers ATT'Y.

Oct. 4, 1966  F. W. PORTER  3,276,169
VIBRATING EQUIPMENT
Original Filed Feb. 9, 1960  9 Sheets-Sheet 4

INVENTOR
FRANK W. PORTER
BY Rey Eilers ATT'Y.

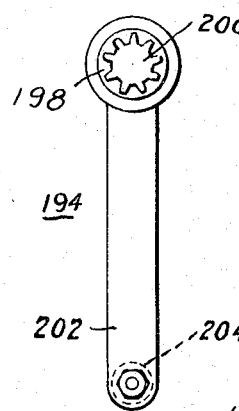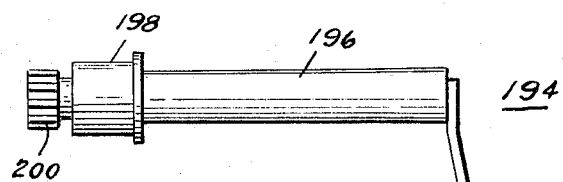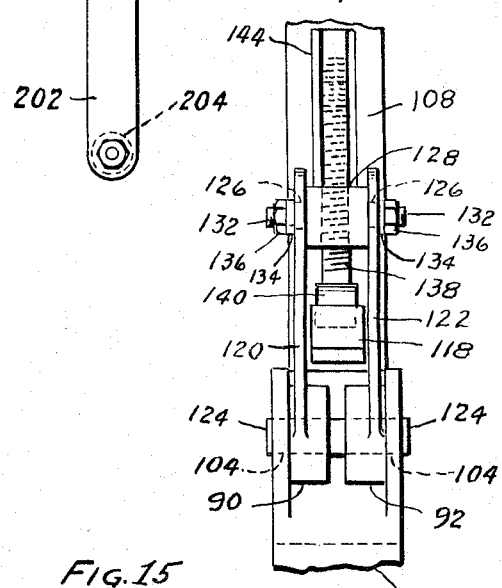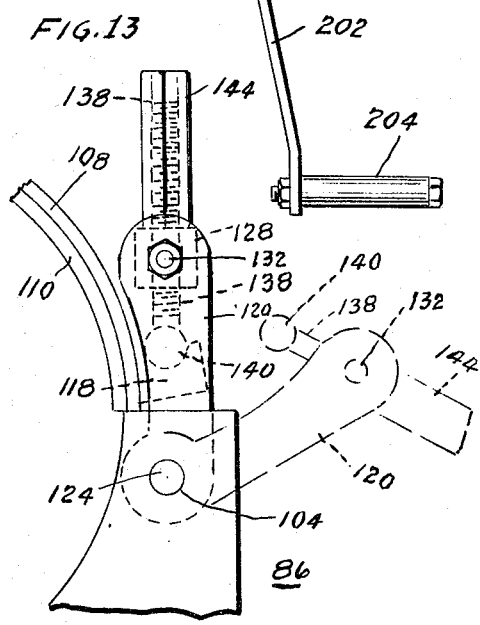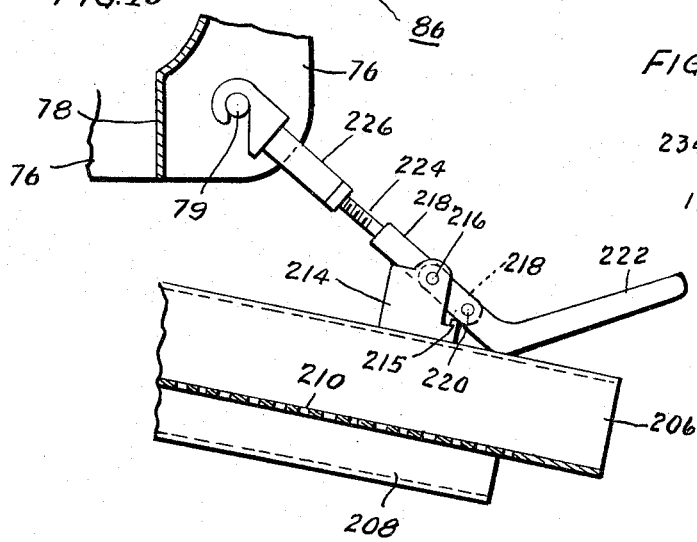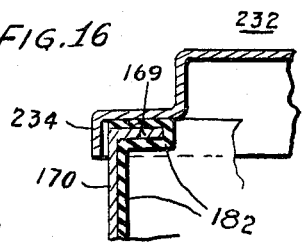

Oct. 4, 1966

F. W. PORTER 3,276,169

VIBRATING EQUIPMENT

Original Filed Feb. 9, 1960

9 Sheets-Sheet 6

INVENTOR
FRANK W. PORTER
Roy Eilers
BY ATT'Y.

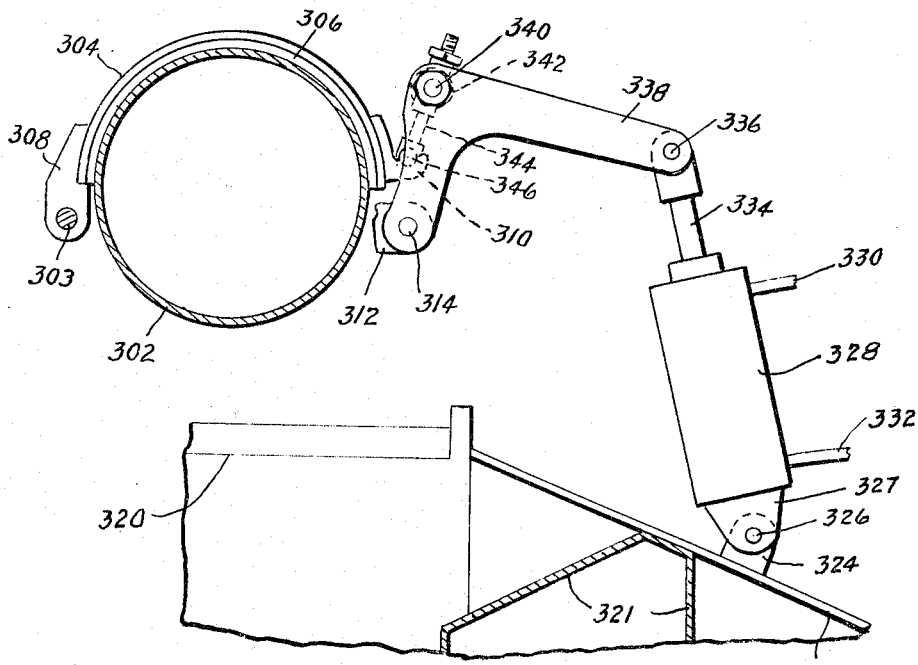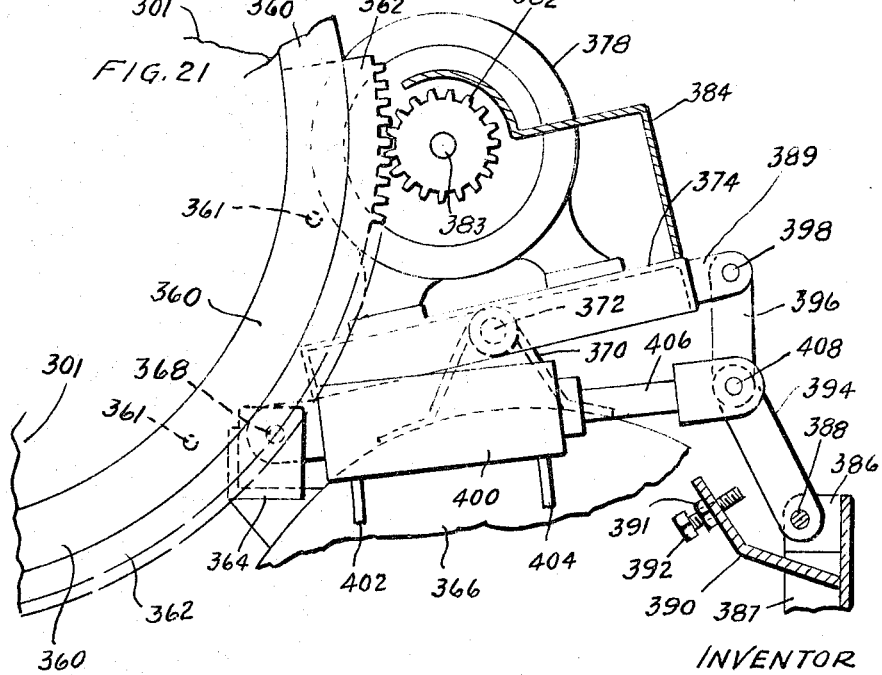

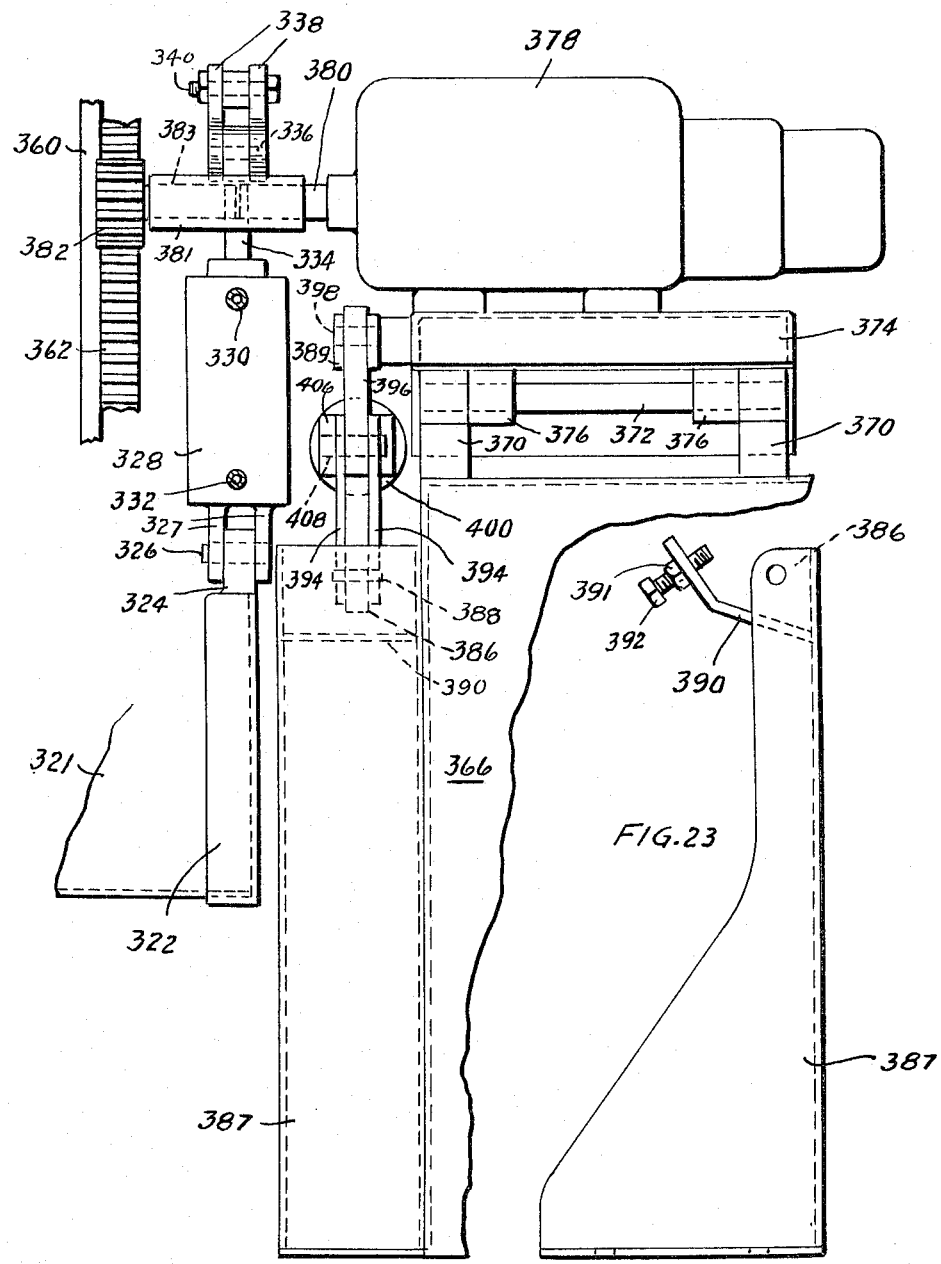

Oct. 4, 1966  F. W. PORTER  3,276,169
VIBRATING EQUIPMENT
Original Filed Feb. 9, 1960  9 Sheets-Sheet 9
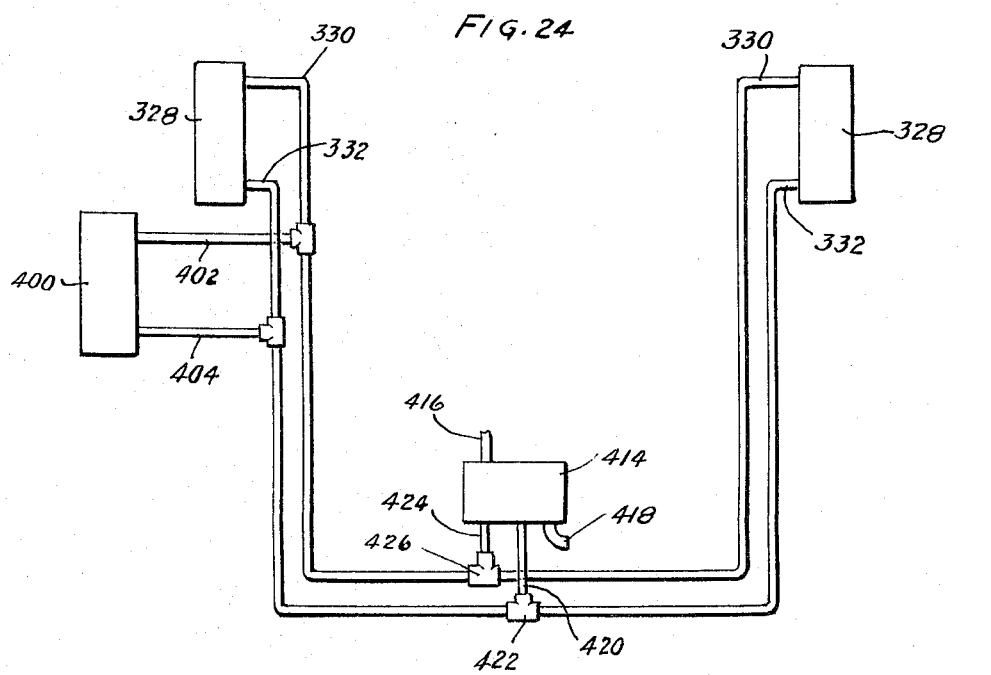
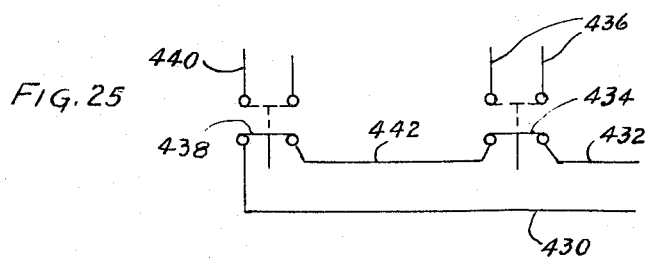
INVENTOR
FRANK W. PORTER
BY  Rey Eilers
ATT'Y.

United States Patent Office 3,276,169
Patented Oct. 4, 1966

3,276,169
VIBRATING EQUIPMENT
Frank W. Porter, Montgomery, Ill., assignor to Productive Equipment Corporation, Chicago, Ill., a corporation of Illinois
Continuation of application Ser. No. 7,690, Feb. 9, 1960. This application Oct. 7, 1963, Ser. No. 315,736
20 Claims. (Cl. 51—163)

This application is a continuation of application Serial No. 7,690, filed February 9, 1960, now abandoned.

This invention relates to improvements in vibrating equipment. More particularly, this invention relates to improvements in vibrating devices which can be used to polish articles.

It is therefore an object of the present invention to provide an improved vibrating device which can be used to polish articles.

It is frequently desirable to polish articles and to give them a smooth and attractive finish. Various methods and devices have been proposed to effect the desired polishing of articles, and some of those methods and devices have been used. For many kinds of articles, the best way of providing the desired polishing is to place a polishing material in engagement with those articles and to subject that polishing material to vibrations. The vibrating polishing material will interact with the articles it engages to provide the desired smooth and attractive finish for those articles. The present invention provides an improved device which places polishing material in engagement with articles to be polished and then subjects that polishing material to rapid vibrations of closely controlled amplitude. The rapidity and closely controlled amplitude of the vibrations enable articles which are treated in the device provided by the present invention to receive a very smooth and attractive finish.

In the device provided by the present invention, the polishing material is held within a container that is vibrated; and that polishing material responds to the vibrating of that container to move relative to the interior of that container. As that polishing material moves, it acts upon the articles to be polished and provides the desired smooth and attractive finish for those articles. The container is substantially circular in cross section to cause the polishing material to follow smooth, substantially circular paths as it moves relative to the container; and the container has an opening through which the polishing material and the articles to be polished can be charged into the container. The container is normally disposed so the opening is at the top thereof, but that container can be tilted to place that opening adjacent the bottom thereof for emptying. The container will be full when it is to be tilted for emptying, and that container and its contents will be heavy. It would be desirable to mount that container so it could be tilted easily and without any need of sizeable forces. The present invention mounts the container so it can be tilted easily and without any need of sizeable forces, and it does so by equipping the container with arcuate bearing surfaces and by providing rollers that underlie and support those bearing surfaces. The rollers are arranged to define arcuate sockets that receive the arcuate bearing surfaces, and those sockets confine and center the container. Whenever the container is to be held in position with its opening at the top thereof, the rollers merely serve to support, confine and center the container; but when the container is to be tilted for emptying, the rollers continue to support, confine and center the container but also rotate to facilitate ready tilting of the container. It is therefore an object of the present invention to equip a container, for a device for polishing articles, with arcuate bearing surfaces and to provide rollers that define arcuate recesses to accommodate said arcuate bearing surfaces.

While it is important that the container be capable of being tilted easily for emptying, it is also important that the container be held rigidly against tilting whenever it is to be charged with polishing material and articles to be polished. Also it is important that the container be held rigidly against tilting whenever that container is to be vibrated. Any tilting of the container during charging could lead to spilling of its contents, and any tilting of the container during vibration could lead to dampening of the vibrations as well as to spilling of the contents of the container. The present invention effectively prevents tilting of the container during the charging or vibrating thereof by providing large clamps of arcuate form that engage and hold the arcuate bearing surfaces on that container. Those clamps can be loosened whenever the container is to be tilted; but until those clamps are loosened, they will rigidly hold the container against tilting. It is therefore an object of the present invention to provide arcuate clamps that can be loosened to permit rotation of the container, for a device for polishing articles, but that normally hold that container rigidly against tilting.

The arcuate clamps provided by the present invention are equipped with latches that enable those clamps to apply retarding forces to the container as it is being tilted. Such retarding forces are desirable because they keep any shifting of the contents of the container, during tilting of the container, from causing that container to lurch toward emptying position. It is therefore an object of the present invention to provide latches for the rotation-controlling clamps, of a device for polishing articles, that enable those clamps to apply retarding forces to the container of that device as that container is being tilted.

In the polishing of some articles, it is desirable to add de-greasing, de-scaling or other compounds to the polishing material, and then to remove those compounds before continuing with the polishing operation. The device provided by the present invention facilitates the addition and subsequent removal of de-greasing, de-scaling or other compounds; and it does so by making it possible to set the container in emptying position and then direct water onto the polishing material. As the container is moved to emptying position, the de-greasing, de-scaling or other compounds will drain out through a porous cover that is provided for the opening in the container; and then the water will be directed onto the polishing material, from a nozzle carried by that porous cover, to dissolve the residual portions of those compounds. That water and its entrained residual portions of those compounds will also drain out through the porous cover. As a result, the polishing material can easily and quickly be freed of de-greasing, de-scaling or other compounds. It is therefore an object of the present invention to provide the container, of a device for polishing articles, with a nozzle-equipped porous cover.

The device provided by the present invention can vibrate the container thereof when that container is in emptying position. This is desirable because it makes it possible for the water from the nozzle carried by the porous screen to contact all portions of the surfaces of the polishing material and thereby remove all of the residual portions of the compounds on those surfaces. As a result, the device provided by the present invention can provide full cleaning of the polishing material without any need of removing that material from the container of that device. It is therefore an object of the present invention to provide a device, for polishing articles, with a tiltable container that can be vibrated when it is in emptying position.

The container of the device provided by the present invention is equipped with a rack; and a pinion is provided that can mesh with that rack to rotate the container toward and away from emptying position. It would be undesirable to have the teeth of that pinion in engagement with the teeth of that rack while that container was being vibrated. The present invention avoids such engagement by providing a pinion which is selectively engageable with and separable from the rack on the container. It is therefore an object of the present invention to equip the container, of a device for polishing articles, with a rack, and to provide that device with a pinion that is selectively engageable with that rack to rotate that container into and out of emptying position.

At the conclusion of the polishing operation, the polished articles must be separated from the polishing material. Heretofore the required separation of the polished articles from the polishing material has been effected by placing the admixed polished articles and polishing material on a motor-driven vibrating screen, and by operating that screen until the polishing material passed through the pores of that screen and the polished articles worked their way down to, and off of, the lower end of that screen. It would be desirable to obviate the cost of the motor-driven vibrating screen and to obviate at least part of the expense of operating that motor-driven vibrating screen. The present invention obviates the cost of the motor-driven vibrating screen and also obviates part of the expense of operating that motor-driven vibrating screen; and it does so by providing an inexpensive screen which can be attached to and vibrated by the device provided by the present invention. That device will be vibrated when the container thereof is in emptying position, because the resultant vibrations will facilitate full emptying of that container; and those vibrations will also enable the inexpensive screen to effect separation of the polished articles from the polishing material. In this way, the present invention obviates the need of providing a motor-driven vibrating screen to separate the polished articles from the polishing material. It is therefore an object of the present invention to provide a polishing device with an inexpensive screen that can be attached to and vibrated by that device.

The device provided by the present invention has a vibratable frame that is held against titling; but that frame supports the container for that device in such a way that the said container can be tilted to emptying position. By having such a frame the present invention minimizes the total mass that must be tilted; thereby reducing the forces needed to effect tilting and restoring of the container, and also reducing the time required for the tilting and restoring operations. It is therefore an object of the present invention to provide a device, for polishing articles, with a vibratable frame that is held against tilting but that permits tilting of the container of said device.

The container of the device provided by the present invention is equipped with a yieldable lining; and that lining facilitates the movement of the polishing material through circular paths within the container. That lining projects outwardly of the container adjacent the opening for that container; and, in doing so, it serves as a gasket for the covers for that opening. In addition to the porous cover that is provided for the draining operation, a solid cover will be provided to prevent loss of any of the contents of the container when the polishing material that is being vibrated has had an appreciable quantity of liquids added to it. Whether the porous cover or the solid cover is used, the projecting portion of the lining for the container will serve as a gasket for that cover.

Other and further objects and advantages of the present invention should become apparent from an examination of the drawings and accompanying description.

In the drawings and accompanying description two preferred embodiments of the present invention are shown and described but it is to be understood that the drawings and accompanying description are for the purpose of illustration only and do not limit the invention and that the invention will be defined by the appended claims.

In the drawings, FIG. 1 is a plan view of one embodiment of polishing device that is made in accordance with the principles and teachings of the present invention, and it shows that device as it appears when the cover thereof has been removed, FIG. 2 is a side elevational view of the polishing device of FIG. 1, FIG. 3 is a plan view of the solid cover for the container of the polishing device of FIGS. 1 and 2, and it shows that cover as it appears when the clamps that releasably hold that cover to that container have been removed, FIG. 4 is a sectional view, on an enlarged scale, of part of the solid cover and of part of the container of the polishing device of FIGS. 1 and 2, and it shows one of the clamps which are not shown in FIG. 3.

Figure 10:
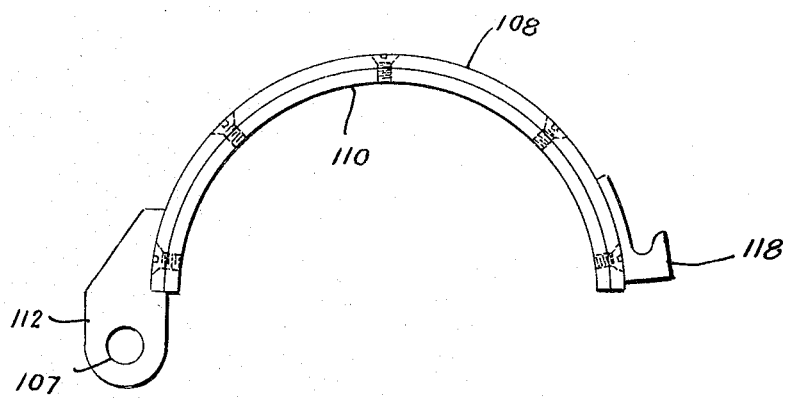
Figure 9:
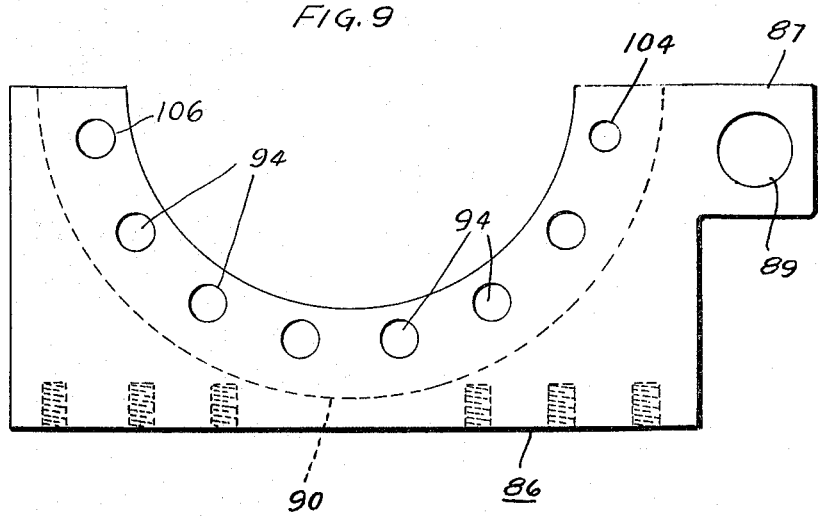

FIG. 5 is a broken end view, on the scale of FIG. 4, of the clamp shown in FIG. 4, FIG. 6 is a side elevational view of part of the vibratable frame of the polishing device of FIGS. 1 and 2 plus some of the components which regulate the tilting of the container of that device, FIG. 7 is a sectional view, on an enlarged scale, and it is taken along the plane indicated by the line 7—7 in FIG. 6, FIG. 8 is a sectional view, on the scale of FIG. 7, and it is taken along the broken plane indicated by the line 8—8 in FIG. 6, FIG. 9 is a side elevational view of one of the roller-supporting castings of the vibratable frame for the polishing device of FIGS. 1 and 2, FIG. 10 is a side elevational view of one of the arcuate clamps for the polishing device of FIGS. 1 and 2, FIGS. 11 is an end view of the crank that is used to rotate the container of the polishing device of FIGS. 1 and 2, FIG. 12 is a side elevational view of the crank of FIG. 11, FIG. 13 is a side elevational view of part of one of the arcuate clamps of the polishing device of FIGS. 1 and 2, and of the latch for that clamp.

Figure 17:
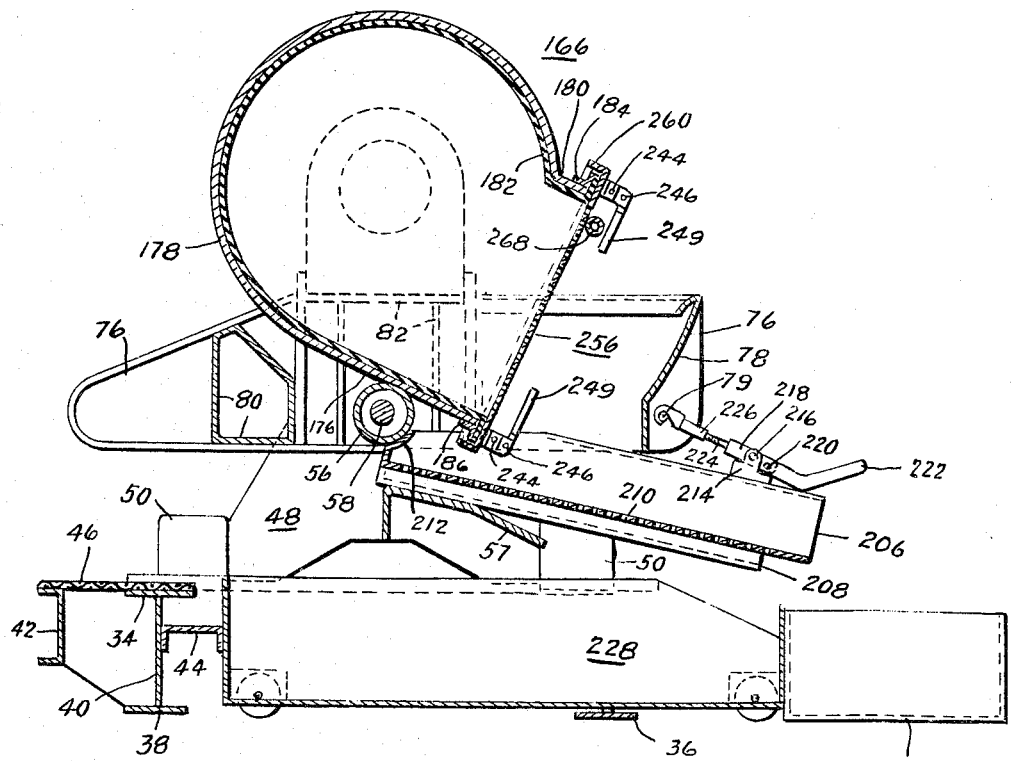
Figure 18:
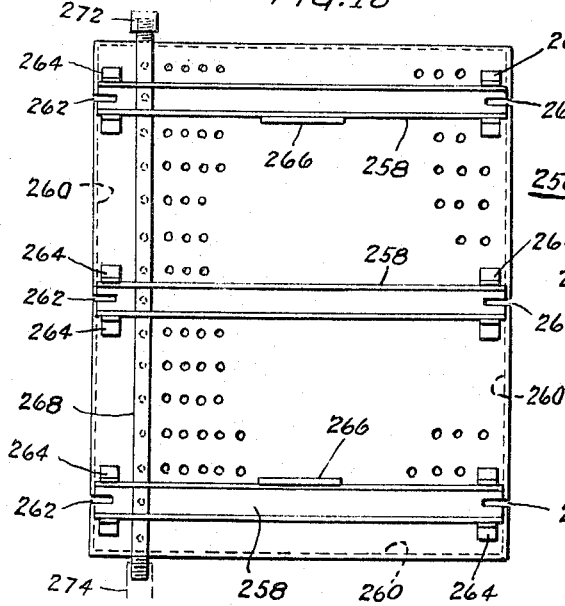
Figure 19:
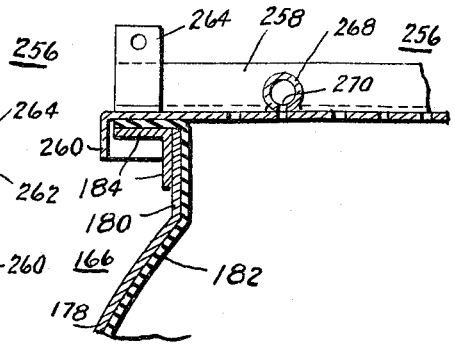

FIG. 14 is a view of the latch of FIG. 13, and it is taken from the right-hand side of FIG. 13, FIG. 15 is a side elevational view of part of the inexpensive screen used with the polishing device of FIGS. 1 and 2, and it shows the locking mechanism that releasably holds that screen in assembled relation with that polishing device, FIG. 16 is a sectional view through part of the solid cover and part of the container of the polishing device of FIGS. 1 and 2, and it is taken along the plane indicated by the line 16—16 in FIG. 1, FIG. 17 is a vertical sectional view through the polishing device of FIGS. 1 and 2, and it is taken along the plane indicated by the line 17—17 in FIG. 1, but it shows the container tilted, FIG. 18 is a plan view of the porous cover for the container of the polishing device of FIGS. 1 and 2, and it shows that cover as it appears when the clamps that releasably hold that cover to that container have been removed, FIG. 19 is a sectional view, on an enlarged scale, through the polishing device of FIGS. 1 and 2, as that device appears when the porous cover is assembled with the container of that device, FIG. 20 is a partially-broken, partially-sectioned, side elevational view of one portion of another embodiment of polishing device that is made in accordance with the principles and teachings of the present invention, FIG. 21 is a side elevational view of another portion of the polishing device of FIG. 20, FIG. 22 is an end view of that portion of the polishing device which is shown in FIG. 21 but the guard has been removed, FIG. 23 is a side elevational view of a supporting bracket that is partially shown in FIG. 21, FIG. 24 is a schematic diagram of the pneumatic system that controls the structure shown in FIGS. 20–23, and FIG. 25 is a schematic diagram of the electrical circuit for the motor that operates the vibration-imparting mechanisms used with the embodiment of polishing device shown in FIGS. 20–23.

Referring to the drawings in detail, the numeral 30 denotes a base at one side of the polishing device provided by the present invention, and that base is best shown in FIG. 2. That base is fabricated from plates of suitable thickness and strength, and those plates are suitably secured together. A top plate 32 is provided for the base 30, and that plate is thick enough to be sturdy and strong.

The numeral 34 denotes the top plate for another base for the polishing device provided by the present invention. The top plate 34 and the other base are adjacent the other side of the polishing device, but are in alinement with the top plate 32 and the base 30.

A connecting plate 36 is disposed at ground level and extends between and interconnects the two bases. A second connecting plate 38 is disposed at ground level, as shown by FIG. 17, and that plate also extends between and interconnects the two bases. A vertically-directed plate 40 is disposed above the connecting plate 38, as shown by FIG. 17, and that plate extends between and is connected to the two bases. A channel 42, shown by FIG. 17, extends between and is connected to the left-hand ends of the two bases of the polishing device provided by the present invention. A second channel 44 extends between and is secured to the two bases for the polishing device provided by the present invention; and one of the flanges of that channel is suitably secured to the plate 40, as shown by FIG. 17. The two bases, the two top plates 32 and 34, the three connecting plates 36, 38 and 40, and the two connecting channels 42 and 44 provide a sturdy and rigid foundation to support the polishing device provided by the present invention.

A heavy screen 46 is secured to the left-hand ends of the top plates 32 and 34 and is also secured to the top of channel 42. That screen is heavy enough to support the weight of several workmen, but has openings large enough to permit water, compounds and polishing material to pass through them. As a result, the top surface of screen 46 remains fairly clear.

The numeral 48 denotes a pedestal of a vibrating machine used to supply the vibrations needed in the polishing device of the present invention. That pedestal is preferably of the type shown in Lewis E. Soldan Patent No. 2,238,711 for Screening Apparatus which was granted April 15, 1941. That pedestal is provided with two feet 50 which are underlain by "shoes" 52; and those shoes are preferably of rubber or the like. Those shoes are supported by top plate 32 of base 30; and that top plate is wider than those shoes. The pedestal 48 has an arcuate seat, not shown, adjacent the top thereof; and that arcuate seat accommodates part of the circular casing portion 54 for one of the vibration-imparting mechanisms of the said vibrating machine.

A second and identically-similar pedestal 48 is mounted on the other base of the polishing device; and the feet 50 of that second pedestal rest on rubber shoes 52 which in turn rest upon the top plate 34 of that other base. That second pedestal 48 has an arcuate seat, not shown, adjacent the top thereof; and that arcuate seat accommodates the circular casing portion 54 for the other vibration-imparting mechanism of the said vibrating machine.

The rotatable parts of the two vibration-imparting mechanisms are connected together by a shaft 58; and that shaft rotates freely within a non-rotative tube 56 secured to non-rotating portions of the two vibration-imparting mechanisms. While the vibrating machine of the said Lewis E. Soldan patent is very useful, other comparable vibrating machines could be used.

The numeral 60 denotes the overall housing for a motor and for a variable speed drive operated by that motor. That housing, and the motor and the variable speed drive which it encloses, are standard items of manufacture and are not, per se, part of the present invention. A hand wheel 62 projects from the housing 60 and can be rotated to adjust the variable speed drive. That drive connects the motor to a sheave, not shown, on the shaft 58; and hence operation of the motor within housing 60 will cause rotation of shaft 58. That rotation will cause the vibration-imparting mechanisms within the casing portions 54 to cause the tube 56 to vibrate relative to the pedestals 48.

A closure plate 64 is secured to that casing portion 54 which is adjacent the housing 60, and that plate extends toward but terminates short of that housing. That plate has a central opening through which shaft 58 extends.

The casing portions 54 for the motion-imparting mechanisms have vertically-directed pivots 66 at the ends thereof. Torque arms 68 are rotatably held by the pivots 66, and those torque arms extend outwardly from the ends of the casing portions 54. The outer ends of those torque arms are secured to flexible discs, not shown, which are overlain and protected by circular plates 70. Those flexible discs are supported by studs 72 which extend outwardly from the end walls 74 and 76 of the vibratable frame for the polishing device provided by the present invention. Those walls are suitably fabricated from sheet metal and from stiffening members, and the studs 72 are suitably secured to some of those stiffening members. The details of the torque arms 68, of the flexible discs, of the plates 70, and of the studs 72 are given in the said Lewis E. Soldan patent. Tubular diaphragms 75 extend between the casing portions 54 and the end walls 74 and 76 of the vibratable frame.

An apron 78 extends between and is connected to the walls 74 and 76 of the vibratable frame of the polishing device provided by the present invention. That apron has a vertically-directed lower part and has an arcuate upper part, as emphasized particularly by FIG. 17. A rod 79 also extends between and is secured to walls 74 and 76 of the vibratable frame; and that rod is disposed to the right of the vertically-directed part of apron 78 and is disposed below the arcuate part of that apron. Tube 56 that encases rotatable shaft 58 also extends between and is secured to walls 74 and 76.

A narrow pad or plate 57 is secured to, and extends inwardly from, the inner face of wall 74; and a similar pad or plate is secured to and extends inwardly from the inner face of wall 76. Each of those plates has a vertically-directed flange at its left-hand edge and has a downwardly inclined right-hand edge, as those plates are viewed in FIG. 17. The plates 57 are disposed below and to the right of the center line of non-rotative tube 56.

The walls 74 and 76 of the vibratable frame have inwardly and downwardly extending flanges at their upper edges, and apron 78 has an inwardly and downwardly extending flange at its upper edge. Those inwardly and downwardly extending edges help stiffen the vibratable frame and also help cause any material that may spill upon those edges to move inwardly of that frame.

The numeral 80 generally denotes a box-shaped brace which is adjacent the left-hand ends of the walls 74 and 76 of the vibratable frame. That brace coacts with apron 78, rod 79 and tube 56 to hold the walls 74 and 76 in rigidly-spaced relation and to add strength and rigidity to the vibratable frame for the polishing device of the present invention. As indicated by FIG. 17, the portions of the walls 74 and 76 to which the box-shaped brace is attached are generally triangular in side elevation.

The numeral 82 denotes rigid frameworks which are incorporated within, and are integral parts of, the walls 74 and 76 of the vibratable frame. Those frameworks are suitably fabricated from sturdy bars, and they strengthen the side walls 74 and 76 and enable those side walls to support heavy static and dynamic loads. The frameworks 82 are somewhat open in nature; and hence they readily accommodate the rotatable shaft 58 and the non-rotative tube 56 will extend between the vibration-imparting mechanisms within the casing portions 54 held by pedestals 48. The frameworks 82 have flat plates at the tops thereof; and those flat plates have vertically-directed openings 84 therein to accommodate fasteners.

The numeral 86 denotes two castings which are generally U-shaped in configuration; and one of those castings is shown in detail in FIG. 9. One of the castings 86 has a boss 87 at the right-hand end thereof, as shown particularly by FIG. 6, and that boss has an opening 89 through it. The castings 86 have flat bottoms, and those bottoms have openings which are threaded for fasteners. The flat bottoms of the castings 86 rest upon and are supported by the flat plates at the tops of the frameworks 82, and the openings in those flat bottoms and in those flat plates are in register with each other. Fasteners 88, such as machine screws, extend upwardly through the openings 84 in the flat plates and seat in the openings in the bottoms of the castings 86 to fixedly secure those castings to the walls 74 and 76 of the vibratable frame.

Each of the castings 86 has a groove 90 and a second groove 92, as shown by FIG. 8. The grooves 90 and 92 are rectangular in cross section, and each of them has an angular extent of approximately one hundred and eighty degrees. Those grooves are contiguous to, and extend radially outwardly from, the curved faces of the castings 86. The grooves 90 and 92 in each casting 86 coact to define an arcuate separator of rectangular cross section between them.

Each of the castings 86 has a number of circumferentially-spaced, axially-directed openings 94 through it. Those openings communicate with the grooves 90 and 92, and those openings receive bolts 96, as shown particularly by FIG. 8. Washers 100 and rollers 102 are telescoped over and are supported by the bolts 96; and the rollers 102 are largely disposed within the grooves 90 and 92. However, portions of the periphery of each of those rollers project radially inwardly from the curved face of its casting 86. If desired, ball bearings or roller bearings could be used instead of the rollers 102. The washers 100 are interposed between the rollers 102 and the sides of the recesses 90 and 92, and those washers assure free rotation of those rollers relative to those recesses. Nuts 98 are threaded onto the projecting ends of the bolts 96, and those nuts maintain those bolts, the rollers 102 and the washers 100 in assembled relation with the castings 86. In the particular modification shown, there are six pairs of rollers 102 in each casting 86; and those rollers subtend in excess of one hundred and thirty degrees of the circumference of the circle on which the axes of the bolts 96 lie.

The numeral 104 denotes openings in the right-hand ends of the castings 86, and those openings accommodate pivots 124. One of those pivots is shown in detail in FIG. 14, and that pivot spans both of the recesses 90 and 92. The numeral 106 denotes openings in the left-hand ends of the castings 86, and those openings accommodate the pivots 116. The pivots 116 can be of any convenient form, and they are shown as bolt and nut combinations.

The numeral 108 denotes arcuate clamps that are used in the polishing device of the present invention. Each of those clamps is semi-circular in side elevation, and each of those clamps has a projection 112 at the left-hand end thereof and has a hook-like projection 118 at the right-hand end thereof. An opening 107 is provided in each of the projections 112. Each of the clamps 108 has a facing 110 at the inner periphery thereof, and the facings 110 are made of a material, such as that used in brake-band linings, which is sturdy and which has a high coefficient of friction.

The numeral 120 denotes elongated plates with circular hubs, and those hubs have openings that accommodate the pivots 124. The numeral 122 denotes elongated plates with circular hubs, and those hubs have openings that accommodate the pivots 124. The hubs of the plates 120 and 122 are disposed within the grooves 90 and 92, respectively, and the pivots 124 permit those plates to rotate relative to the castings 86.

The numeral 126 denotes openings in the free ends of the plates 120 and 122, and those openings are in register with each other. A square hub 128 is disposed between the free ends of each pair of plates 120 and 122; and that hub has cylindrical bosses which are rotatably held within the openings 126 in the plates 120 and 122. Those bosses have axially-projecting threaded portions 132 of reduced diameter; and washers 134 are telescoped over those threaded portions and are located adjacent the outer faces of the plates 120 and 122. Nuts 136 are threaded onto the threaded portions 132, and those nuts prevent accidental separation of the hub 128 from the plates 120 and 122.

The numeral 138 denotes threaded rods which are disposed within threaded passages through the square hubs 128; and these rods can be rotated relative to those hubs to adjust their vertical positions relative to those hubs. Each rod is held between a pair of plates 120 and 122; and each rod 138 has a rounded cam 140 at the bottom thereof. The cams 140 are adapted to fit within the concave recesses of the hooks 118 on the right-hand ends of the clamps 108. The upper ends of the rods 138 extend upwardly from the square hubs 128, and hexagonal sleeves 144 telescope over those upper ends. The sleeves 144 can be rotated to rotate the rods 138 relative to the plates 120 and 122. Each pair of plates 120 and 122 with its hub 128 and its rod 138 constitutes a latch that can coact with an adjacent hook 118 to hold its clamp 108 in clamping position.

Each of the castings 86 will be equipped with its sets of rollers 102, and each of those castings will be equipped with its clamp 108 and with its latch for that clamp. While the clamps and latches for the two castings will be in the same general position, those clamps and latches can be operated independently of each other.

The numeral 150 generally denotes two castings, and each of those castings has a sleeve-like portion 152. That sleeve-like portion has an external groove which defines a radially-extending annular lip at the outer edge of that sleeve-like portion. Each casting 150 has a web 156 that closes the inner end of the sleeve-like portion; and each casting has a flange 158 that is annular and that projects radially outwardly beyond the sleeve-like portion 152. A shallow groove 160 is formed in the outer face of the flange 158 adjacent the periphery of that flange, as shown particularly by FIGS. 7 and 8. A central recess 162 of circular form is formed in each casting 150, and that recess is at the inner face of the web 156.

The central recess 162 of one fo the castings 150 accommodates a heavy circular plate 164, and that plate is welded to the end wall 168 of the container 166 of the polishing device provided by the present invention. The other end wall of the container 166 is denoted by the numeral 170; and a heavy circular plate welded to that end wall is accommodated by the central recess 162 of the other casting 150. Screws 174 extend through openings in the webs 156 of the castings 150 and seat in threaded openings in the heavy circular plates 164, thereby securing the castings 150 to the end walls 168 and 170 of the container 166. The heavy circular plates 164 stiffen the end walls 168 and 170 of the container 166 and help distribute the vibrational forces to be applied to the container 166, thereby minimizing the shearing forces applied to any given area of the end walls 168 and 170.

The end wall 168 has an inwardly-extending flange 169 at the top edge thereof, as indicated by FIG. 1. The end wall 170 also has an inwardly-extending flange 169 at the top edge thereof, as indicated by FIG. 1. and 16. The flanges 169 help stiffen the end walls 168 and 170 and also serve to define the narrow sides of the opening in the top of container 166.

The side wall of the container 166 has a straight portion 176 and has a cylindrical portion 178, as shown particularly by FIG. 17. The cylindrical portion 178 of the side wall of container 166 terminates in a second straight portion 180; but that second straight portion is very much shorter than the straight portion 176. A reinforcing angle 184 is secured to the outer face of the straight portion 180 of the side wall of the container 166 adjacent the upper edge of that straight portion, and the horizontal portion of that angle projects outwardly from that straight portion. In doing so, that portion of that angle partially overlies the cylindrical portion 178 of the side wall of the container 166. A similar reinforcing angle 186 is secured to the outer face of the straight portion 176 of the side wall of the container 166 adjacent the upper edge of that straight portion, and the horizontal portion of that angle projects outwardly from that straight portion. The angles 184 and 186 help stiffen and reinforce the side wall of the container 166 and also define the elongated sides of the opening in that container.

A lining 182 is provided for the end walls and for the side wall of the container 166, and that lining is preferably made from a yieldable material such as neoprene. That lining extends outwardly through the opening in the container 166, and it is bent over and secured to the flanges 169 of the end walls 168 and 170, as shown by FIG. 16. In addition, that lining is bent over and secured to the horizontal portions of the reinforcing angles 186 and 184, as shown by FIG. 19. The bent-over portions of the lining 182 serve as a gasket for the covers that are used to overlie the opening in the container 166.

Transversely-extending slots 188 are provided in the horizontal portion of the reinforcing angle 186, and transversely-extending slots 190 are provided in the horizontal portion of the reinforcing angle 184, as shown particularly by FIG. 1. Corresponding slots are formed in the bent-over portions of the lining 182 which overlie those portions of those angles. In the particular container 166 shown, there are three slots 188 and there are three slots 190; and those slots are spaced along the lengths of the angles 186 and 184, respectively.

The numeral 192 denotes a segment of an arcuate rack; and that rack segment is disposed within the shallow groove 160 adjacent the periphery of that casting 150 which is secured to the end wall 168 of the container 166. That rack segment has an angular extent of approximately one hundred and twenty degrees; and its teeth project outwardly beyond the periphery of that flange 158. Portions of that rack segment are in register with the opening 89 in the boss 87, on the casting 150 which is secured to the end wall 168, whenever the container 166 is in its upright position or is in its emptying position or is in any position therebetween.

The external grooves in the sleeve-like portions 152 of the castings 150 are wide enough to accommodate the faces of the pairs of rollers 102 which are rotatably supported by those castings, as shown by FIG. 8. Those external grooves also are wide enough to accommodate the facings 110 at the inner peripheries of the arcuate clamps 108, as shown by FIG. 7. The length of the container 166 is such that the external grooves in the sleeve-like portions 152 of the castings 150 can be neatly centered with regard to the paired rollers 102.

The rollers 102 underlie the lower areas of the external grooves in the sleeve-like portions 152 of the castings 150, and they will support those castings and confine them against appreciable lateral or longitudinal movement. However, those rollers can rotate relative to the castings 86 to permit the castings 150 and the container 166 to tilt relative to the vibratable frame of the polishing device of the present invention.

The clamps 108 overlie the upper areas of the external grooves in the sleeve-like portions 152 of the castings 150, and the linings 110 of those clamps can be pulled down into intimate and braking engagement with the external grooves in the sleeve-like portions 152 of the castings 150. Whenever this is done, those linings will apply such sizeable frictional forces to the castings 150 that those castings and the container 166 will be positively held against tilting relative to the vibratable frame of the polishing device.

To pull the linings 110 of the clamps 108 down into intimate and braking engagement with the external grooves of the sleeve-like portions 152, the sleeves 144 will be rotated from the dotted-line position to the solid-line position in FIG. 13. As those sleeves are being so rotated, the cams 140 at the free ends of the rods 138 will be set within the concave portions of the hooks 118; and, as a result, further counter clockwise rotation of the sleeves 144 will cause those cams to apply downward forces to the hooks 118. By the time the sleeves 144 reach the solid-line position shown in FIG. 13, those hooks will have been forced downwardly far enough to place the linings 110 in intimate and braking engagement with the external grooves in the sleeve-like portions 152 of the castings 150.

To release the clamps 108, and thereby permit tilting of the container 166, it is only necessary to rotate the sleeves 144 in the clockwise direction. Such rotation permits the cams 140 to move upwardly and thereby permit the hooks 118 on the clamps 108 to move upwardly. At such time, only the weights of the clamps 108 will hold them against the castings 150; and the weights of those clamps can not produce a braking engagement between the linings 110 and the sleeve-like portions 152.

Where desired, the sleeves 144 can be rotated so far in the clockwise direction that the cams 140 are moved wholly out of engagement with the hooks 118 on the clamps 108. At such time, the clamps 108 can be rotated in the counter clockwise direction about the pivots 116 until those clamps are wholly displaced laterally from the sleeve-like portions 152 of the castings 150. Thereupon the container 166 can be lifted up and can be bodily removed from the vibratable frame of the polishing device. Such removal is very desirable when the lining 182 has to be replaced.

The numeral 194 generally denotes a crank that can be used to effect manual tilting of the container 166. That crank has a shaft-like portion 196, and it has a sleeve 198 which is rotatably mounted on that shaft-like portion. The sleeve 198 is dimensioned to telescope within the opening 89 of the boss 87, and when that sleeve telescopes within that opening it will act as a bearing for the shaft-like portion 196 of the crank 194. A flange is provided on the sleeve 198, and that flange acts to limit the extent to which that sleeve can be telescoped into the opening 89 in the boss 87.

The shaft-like portion 196 of the crank 194 has a reduced-diameter portion which projects beyond the sleeve 198, and a pinion 200 is mounted on that reduced-diameter portion. The pinion 200 is small enough to telescope into the opening 89 in boss 87, and that pinion has teeth which are formed to mesh with the teeth of the rack segment 192. As a result, when the sleeve 198 is seated in the opening 89 of boss 87, the pinion 200 will be in meshing engagement with the teeth on the rack segment 192. The numeral 202 denotes the crank arm for the crank 194, and the numeral 204 denotes the rotatable handle at the end of that crank arm.

Whenever the container 166 is to be tilted, the crank 194 will be set in position to cause its pinion 200 to mesh with the rack segment 192, as shown by FIGS. 1 and 2. However, whenever the container 166 is to be fixedly held against tilting, the crank 194 will be removed. In this way, injury to the teeth of the pinion 200 and of the rack segment 192 is avoided.

The numeral 206 denotes the frame of an inexpensive screen, and that screen has stiffening members 208 at the bottom thereof. That screen has a porous surface 210; and the pores of that surface are small enough to prevent the passage therethrough of polished articles but are large enough to permit the passage therethrough of polishing material.

The frame 206 of the inexpensive screen has a concave portion 212 adjacent the upper left-hand end thereof, and the radius of curvature of that concave portion is equal to the outer radius of the non-rotative tube 56. As a result, the concave portion 212 of the screen frame neatly fits the lower right-hand portion of the outer surface of the non-rotative tube 56. Whenever the concave portion 212 of the screen frame 206 neatly abuts the lower right-hand portion of the outer surface of the non-rotative tube 56, the stiffening members 208 rest upon and are supported by the plates 57.

The numeral 214 denotes pivot blocks that are mounted on the opposite sides of the screen frame 206; and those pivot blocks support pivots 216. V-shaped levers 222 are rotatably secured to the pivots 216, and those levers carry pivots 220 intermediate the ends thereof. Links 218 have the lower ends thereof rotatably secured to the levers 222 by the pivots 220; and each of the links 218 has a threaded rod 224 secured to its left-hand end. Those threaded rods are secured to hooks 226; and those hooks can telescope over the rod 79 which extends between the walls 74 and 76 of the vibratable frame, as shown by FIGS. 15 and 17.

When the hooks 226 are set in engagement with the rod 79, and when the V-shaped levers 222 are pressed downwardly toward the stops 215 on the pivot blocks 214, the pivots 220 carried by those levers will move toward the left. As those pivots do so, they will urge the links 218 toward the left and thereby urge the screen frame 206 into intimate engagement with tube 56 and plates 57. When the levers 222 reach the position shown by FIG. 15, the concave portion 212 of the screen frame 206 will be solidly abutting the tube 56 and the stiffening members 208 will be solidly abutting the upper surfaces of plates 57.

When the screen frame 206 is secured to the vibratable frame of the polishing device, the screen 210 thereof underlies the opening in the container 166 whenever that container 166 is tilted, as shown by FIG. 17. The apron 78 of the vibratable frame will help guide the contents of the container 166 onto the screen 210; and hence that screen will intercept all of the contents issuing from the container 166. The polished articles will be held by the screen 210 and will work their way down along the length of that screen, and the polishing material will pass through that screen. The polishing material that passes through the screen 210 will fall into a chip box 228, and the polished articles will work down to the lower edge of the screen 210 and fall into a tote box 230.

The opening in the container 166 can be overlain by a substantially imperforate cover 232 or by a porous cover 256. The cover 232 is generally arcuate in cross section but it has a flat, horizontally-extending flange 238 that extends around all of the sides thereof. The under surface of that flat flange can be placed in engagement with those portions of the lining 182 which extend outwardly beyond the opening in the container 166 and are then bent over the flange 169 on the end walls 168 and 170 of container 166 and over the horizontally-extending portion of the reinforcing angles 184 and 186 for that container, and when so placed, that under surface of that flat flange coacts with those portions of that lining to provide a liquid-tight seal. A skirt 239 extends downwardly from the outer edge of the flat flange 238 on the cover 232; and that skirt thus overlies and protects the edges of the portions of the lining 182 which extend outwardly from the opening in the container 166 and are then bent over. Slots 254 are formed in the skirt 239 and in the flange 238, and those slots will be in register with the slots 188 and 190 in the reinforcing angles 186 and 184, respectively, on the container 166 whenever the cover 232 is set in position to overlie and close the opening in the container 166.

The cover 232 is equipped with two handles 234, and those handles are adjacent the opposite sides of that cover. Both of those handles are shown by FIG. 3, but only one of those handles is shown by FIG. 2; the other of those handles being obscured by the handle that is shown. The cover is light enough in weight to be easily lifted by the operator of the polishing device. The cover 232 is equipped with two short, vertically-directed lengths of pipe 236; and those lengths of pipe are shown by FIG. 3. Those lengths of pipe serve as vents and thereby permit gases or vapors to escape from the container 166.

The flat, horizontally-extending flange 238 of the cover 232 has pairs of angles 240 secured to it; and the angles of each pair of angles are set with their vertically-directed portions in confronting relation, as shown by FIG. 3. Each pair of angles 240 has the angles thereof disposed at the opposite sides of a slot 254. Each angle 240 has an opening in the vertically-directed portion thereof, and the openings in the vertically-directed portions of the angles 240 of each pair of angles are alined and in register with each other. Bolt and nut combinations 244 extend through the openings in the vertically-directed portions of the angles 240 and rotatably secure a handle 249 to those angles. The handle 249 could be made in a number of ways, but it is preferably made by bending two L-shaped plates so they have offsets in the horizontally-directed portions thereof and then welding those horizontally-directed portions together in such a way that the offsets space the vertically-directed portions of those plates apart. Where that is done, the vertically-directed portions of the two plates of each handle 249 can abut the spaced-apart confronting faces of the angles 240 of a pair of angles, as shown by FIG. 5.

Openings are provided in the plates of each handle 249, and those openings support a pivot 246. That pivot passes through the hub of a threaded rod 248 and permits rotation of that rod relative to the handle 249. Suitable fasteners 242 are provided on the ends of the pivot 246 to hold that pivot in assembled relation with handle 249 and with threaded rod 248. A washer 250 is telescoped upwardly over the threaded lower end of each rod 248, and that washer is held in position by two nuts 252. The diameters of the washers 250 are larger than the widths of the slots 254 in the skirt 239 and in the flange 238 of the cover 232; and whenever those washers underlie those slots, they prevent separation of the cover 232 from the container 166. However, whenever the cover 232 is to be separated from the container 166, the rods 248 can be rotated outwardly to move the washers 250 out from under the flange 238 and out beyond the skirt 239; and thereupon the cover 232 can be freed from the container 166.

Whenever it is desired to clamp the cover 232 into sealing engagement with the container 166, the rods 248 will be rotated into vertical position to dispose the washers 250 inwardly of the skirt 239 and below the flange 238. Thereafter, the handles 249 will be rotated downwardly to the position shown in FIG. 4. Such rotation will raise the pivot 246 relative to the flange 238 and thereby raise the washers 250 into intimate engagement with the under surface of the horizontal portions of the reinforcing angles 184 and 186. As the handles 249 approach the position shown by FIG. 4, the under surface of the flange 238 will engage the outwardly-extending and bent over portions of the lining 182; and as the handles 249 move all the way into the positions shown by FIG. 4, the flange 238 will compress those portions of the lining. In this way, a liquid-tight seal is provided at the edges of the cover 232.

The porous cover 256 is flat, rather than arcuate, in cross section; and it has a large number of small openings in it. Those openings are large enough to permit liquids, flash, degraded polishing material, and the like to pass through them, but they are large enough to prevent the passage through them of the polishing material used in the container 166. Three channels 258 are secured to the upper face of the cover 256, as by welding; and those channels stiffen and reinforce that cover. Also, that cover is provided with a skirt 260 which helps stiffen and reinforce that cover. Slots 262 are provided in the skirt 260 and in the ends of the channels 258; and these slots are comparable to the slots 254 in the cover 232. As a result, the slots 262 will be in register with the slots 188 and 190 in the reinforcing angles 186 and 184, respectively, whenever the cover 256 is set in position to overlie the opening in the container 166.

Angles 264, comparable to the angles 240 on the cover 232, are secured to the upper face of the cover 256; and those angles have their vertically-directed portions in confronting relation. The vertically-directed portions of the various angles 264 abut the vertically-directed flanges of the channels 258. Handles 249 are rotatably secured to the angles 264, as shown by FIG. 17; and those handles are identical to the similarly-numbered handle in FIGS. 4 and 5. The handles 249 secured to the angles 264 rotatably support rods, not shown, which are identical to the rod 248 of FIGS. 4 and 5; and the lower ends of those rods are equipped with washers and nuts, not shown, which are identical to the washer 250 and to the nuts 252, respectively, of FIGS. 4 and 5. As a result, the handles 249 for the cover 256 can be used to hold the edges of that cover in sealing engagement with the outwardly-extending and bent over portions of the lining 182 of the container 166.

The cover 256 is equipped with two handles 266, and those handles are comparable to the handles 234 of the cover 232. The handles 266 are disposed adjacent two of the channels 258; and, if desired, those handles can be secured to those channels.

Each of the channels 258 has an opening in the two flanges thereof; and all of those various openings are in alinement. Those openings accommodate a length of pipe 268, and that length of pipe is suitably secured to those channels and to the porous cover 256. The pipe 268 has a number of openings therein, and those openings will be in register with corresponding openings in the cover 256. The simplest way to assure registry between the openings 270 and the corresponding openings in the cover 256 is to drill those openings at the same time. The openings 270 and the corresponding openings in the cover 256 serve as spray nozzles.

Each end of the pipe 268 is threaded, and a cap 272 can be secured to one end of that pipe while a hose 274 can be secured to the other end of that pipe. By having both ends of the pipe 268 threaded, the present invention makes it possible to connect the pipe 268 to a source of water with a relatively short hose 274. That source of water should be capable of supplying appreciable quantities of water under appreciable pressure.

In the operation of the polishing device provided by the present invention, the container 166 is set upright with its opening at the top thereof; and then a quantity of polishing material is introduced into that container through that opening. Polishing material such as chips of aluminum oxide, chips of ceramic material, or balls of various materials can be used. Thereafter, the articles which are to be polished are introduced into the container 166 through the opening at the top thereof. If a de-greasing compound, or a de-scaling compound, or some other compound is to be added, that compound will also be introduced into the container 166 through the opening at the top thereof. If the overall charge within the container 166 has a tendency to splash, the solid cover 232 will be placed over the opening in that container and the handles 249 will be rotated downwardly to seal that cover to that container. However, if the overall charge within the container 166 does not have a tendency to splash, the polishing operation can be conducted without using the solid cover 232.

Once the container 166 has been charged, the motor within the housing 60 will be energized. That motor will act through the variable speed drive to rotate the shaft 58 and that shaft will cause the vibration-imparting mechanisms within the casing portions 54 held by pedestals 48 to cause the tube 56 to vibrate relative to those pedestals. The tube 56 is fixedly secured to the end walls 74 and 76 of the vibratable frame and will thus cause that frame to vibrate. The vibrations of that vibratable frame will be transmitted through the frameworks 82 to the castings 86 and then through rollers 102 and castings 150 to the container 166. Those vibrations will coact with the substantially circular cross section of the container 166 to cause the polishing material within that container to move in the clockwise direction, as that container is viewed in FIG. 2. As the polishing material works its way upwardly past the vertical midpoint of the container 166, the curved inner surface of that container will force that material to move to the right and thus keep moving in a circular path. This is desirable because it assures a smooth and continuous motion of the polishing material; and such motion provides the desired polishing of the surfaces of the articles within the container.

If a de-greasing compound or a de-scaling compound, or some other compound is used, it will usually be desirable to remove that compound and then continue the polishing operation. To remove such a compound, the motor within the housing 60 will be de-energized and then the porous cover 256 will be secured to the container 166. If the solid cover 232 was used during the first step of the polishing operation, that cover would, of course, have to be removed before the porous cover 256 could be secured to container 166. Once the porous cover 256 has been secured to the container 166, the sleeve 144 which is adjacent the end wall 170 of the container 166 will be rotated in the clockwise direction to releasing position. At such time, the clamp 108 which is adjacent the end wall 170 of the container 166 will be released.

The pinion 200 of the crank 194 will then be passed through the opening 89 in the boss 87 of that casting 86 which is adjacent the end wall 168 of the container 166; and the teeth of that pinion will mesh with the teeth on rack segment 192. At this time, the operator will be able to control the position of the container 166 by holding the crank handle 204. That operator will hold the container 166 stationary while he rotates the other lever 144 toward releasing position; and then he can effect fully controlled tilting movement of the container 166 by rotating the crank 194 while using that other lever 144 to apply retarding forces to that container. In this way, any sudden shifting of the contents of the container 166, as that container is being tilted, can't cause that container to lurch toward emptying position. Once the container 166 has reached emptying position, the sleeves 144 will be rotated in the clockwise direction to again force the clamps 108 into intimate and braking engagement with the sleeve-like portions 152 of castings 150.

The sleeves 144 define recesses or sockets in the outer ends thereof, and those recesses or sockets can receive the ends of sturdy rods, not shown. Those rods will be removed from those recesses or sockets whenever the container 166 is being vibrated; but the ends of those rods can be inserted in those recesses or sockets whenever that container is to be tilted toward or away from emptying position. Those rods are helpful in lengthening the moment arms of the sleeves 144.

As the container 166 approaches emptying position, the de-greasing or other compound, any removed flash, and any degraded polishing material will tend to drain out through the openings in the porous cover 256. The polishing material will shift into engagement with that cover, but the openings in that cover are small enough to keep that polishing material within the container 166. At this time, the hose 274 which is connected to the pipe 268 on the cover 256 will supply pressurized water to that pipe, and that water will be sprayed into the interior of the container 166. As indicated particularly by FIG. 17, the pipe 268 is adjacent the upper edge of the porous cover 256 whenever the container 166 is in emptying position. This is desirable because the polishing material and articles to be polished adjacent the upper edge of the cover 256 will offer less resistance to the entry of the water from that pipe than would the polishing material and the articles to be polished adjacent the center or adjacent the lower edge of that screen. The water that is sprayed into the container 166 by the pipe 268 will tend to rinse the de-greasing or other compound from the surfaces of the articles to be polished and from the surfaces of the polishing material.

If the polishing material tends to pack, it will be helpful to vibrate the container 166 during the rinsing step. To effect such vibrating, it is only necessary to separate the crank 194 from the rack 192, to separate the rods from the sleeves 144, and to energize the motor within the housing 60. The resulting vibration of the container 166 will cause the various particles of the polishing material to shift and move and thereby enable the water that is sprayed into that container to contact all of the surfaces of those particles and to contact all of the surfaces of the articles to be polished.

As soon as all or substantially all of the de-greasing or other compound has been eliminated, the further flow of water to the pipe 268 will be cut off and sufficient time will be provided for the water to drain out through the openings in the cover 256. If the container 166 was subjected to vibration during the rinsing step, the crank 194 will again have its pinion 200 set in meshing engagement with the rack segment 192. Also, the sturdy rods will again be set in the sockets or recesses defined by the sleeves 144. Thereupon the sleeve 144 adjacent the end wall 170 of container 166 can be rotated to releasing position, and the sleeve 144 adjacent the end wall 168 of that container can be rotated far enough toward releasing position to permit controlled tilting of the container 166 back toward its upright position. That tilting will be effected by appropriate rotation of pinion 200 by crank 194.

If a different compound is to be introduced into the container 166, the porous cover 256 will be removed, the appropriate compound will be introduced, and cover 232 or cover 256 will be secured to the container 166. Thereafter, the crank 194 and the sturdy rods will be removed; and the motor within the housing 60 will be energized. At the end of the period of time that is needed for the compound to perform its function, the motor within the housing 60 will be de-energized; and thereupon the container 166 will be tilted to emptying position to rinse the articles to be polished and to rinse the polishing material.

If no further compound is desired, the porous cover 256 can be removed, and the motor within the housing 60 can be energized. That motor will be kept energized for the time required to effect the desired polishing of the articles immersed within the polishing material. At the end of the polishing step, the screen frame 206 of FIG. 17 will have its left-hand end passed between the end walls 74 and 76 of the vibratable frame until its concave portion 212 abuts the tube 56. At this time, the stiffening members 208 of the screen will be resting upon and supported by the plate 57 which extends between those end walls 74 and 76. The V-shaped levers 222 will be raised upwardly to enable the hooks 226 to be set over the rod 79; and then those levers will be forced downwardly against the stops 215 on the pivot blocks 214. Thereupon the screen frame 206 will be fixedly and securely locked in position relative to the vibratable frame of the polishing device.

A chip box 228 will then be rolled into position under the screen frame 206; and the leading face of the tote box will be moved into engagement with the right-hand flange of the channel 44. That channel thus serves to position the chip box 228 as well as to stiffen the vibratable frame of the polishing device. A tote box 230 will then be rolled into abutting relation with the rear face of the chip box 228. At such time, the container 166 of the polishing device is ready to be emptied.

To empty that container, the sleeve 144 adjacent the end wall 170 is rotated to releasing position, and the pinion 200 on crank 194 is set in meshing engagement with the rack segment 192. The sleeve 144 adjacent the end wall 168 is then rotated far enough toward releasing position to permit controlled tilting of the container 166 toward emptying position. Once that container has reached its emptying position, both sleeves 144 will be rotated in the counter clockwise direction to force the clamps 108 into intimate and braking engagement with the sleeve-like portions 152 on the castings 150. Thereupon the motor within the housing 60 will be energized; and the resulting vibrations will be imparted to the container 166 and to the screen frame 206. The vibration of the container 166 will facilitate full emptying of that container, and the vibration of the screen frame 206 will enable the porous surface 210 to separate the polishing material from the polished articles. Specifically, the vibration of the screen frame 206 will cause the polishing material to fall downwardly through the porous surface 210 and enter the chip box 228 while it will cause the polished articles to work their way down along that porous surface and fall into the tote box 230. As a result, the polishing device provided by the present invention both polishes and separates the articles introduced into the container 166 thereof.

The movement of the polishing material within the container 166 tends to wear and abrade the lining 182 of that container. As a result, it is occasionally necessary to replace that lining. Such replacement would be very awkward if it had to be done while that container was in assembled relation with the rest of the components of the polishing device. The present invention avoids any such awkwardness by making it possible to bodily remove the container 166 from the polishing device. To effect such removal, it is only necessary to rotate the sleeves 144 far enough in the clockwise direction to enable the cams 140 on rods 138 to move wholly out of the path of the hooks 118, and then to rotate the clamps 108 approximately one hundred and eighty degrees in the counter clockwise direction. At such time, the container 166 will be held in position by gravitational forces, and it can easily be lifted up and bodily removed from the polishing device.

Referring to FIGS. 20–25, the numeral 302 denotes the sleeve-like portion of a casting that is secured to one end wall of a container 301 of another embodiment of polishing device that is made in accordance with the principles and teachings of the present invention. The sleeve-like portion 302 corresponds in all particulars to the sleeve-like portion 152 of the casting 150 of FIGS. 1–19. Specifically, the sleeve-like portion 302 is rotatably supported by rollers, not shown, which are comparable to the rollers 102 in FIGS. 6 and 8; and that sleeve-like portion is normally held against tilting by a clamp 304 which is comparable to the clamp 108 and which has a lining 306. A rack segment, not shown, which is comparable to the rack segment 192 is secured within a peripheral groove in the casting of which the sleeve-like portion 302 is a part. That rack segment is engageable by a crank 194 to effect manual tilting of the container 301.

A projection 308 on clamp 304 has an opening through it, and that opening accommodates a fixed pivot 303 which is comparable to the fixed pivot 116 in FIG. 6. The other end of clamp 304 has a hook 310 which is comparable to the hook 118 on clamp 108. The principal differences between clamp 304 and clamp 108 are that clamp 304 is applied and released by a power-operated mechanism whereas clamp 108 is applied and released by hand, and pivot 303 is located adjacent that side of the polishing device toward which the container 301 tilts whereas pivot 116 for the clamp 108 is located away from that side of the polishing device toward which the container 166 tilts.

The numeral 322 denotes one end wall of the vibratable frame of the embodiment shown by FIGS. 20–25; and that end wall is generally comparable to the end wall 74 of FIGS. 1 and 2. However, end wall 322 has been turned so its generally triangular portion is at its right-hand end whereas the generally triangular portion of end wall 74 is at its left-hand end.

The end wall 322 supports a framework 320 which is generally comparable to the framework 82 of FIG. 6; and a casting, not shown, which is comparable to the casting 86 of FIG. 6 will be supported on the framework 320. That casting will rotatably support the rollers, not shown, which will confine and support the sleeve-like portion 302. A second end wall, comparable to the end wall 76 of FIGS. 1 and 17, will be provided for the vibratable frame; and that second end wall will be spaced from the end wall 322. A box-like brace 321 will extend between those end walls; and, in addition, a non-rotative tube, not shown, comparable to the tube 56 will be secured to and will extend between those end walls. Furthermore, an apron, not shown, comparable to the apron 78 and a rod, not shown, comparable to the rod 79 will be secured to and extend between those end walls.

A pivot block 324 is secured to the upper face of the generally triangular right-hand portion of the end wall 322, as shown by FIG. 20; and a pivot 326 is held by and projects outwardly beyond the sides of that pivot block. That pivot extends through openings in the two arms of a yoke 327 which is formed on, and which extends downwardly from, the closed end of a pneumatic cylinder 328. That cylinder has a hose 330 which conducts compressed air to the upper end of that cylinder, and it has a hose 332 which conducts compressed air to the lower end of that cylinder. A piston 334, which has a boss at the upper end thereof, is slidably mounted within the cylinder 328. When compressed air is supplied to the hose 330, the piston 334 is driven to retracted position; and when compressed air is supplied to the hose 332, the piston 334 is driven to extended position. The retracted position of piston 334 is shown in FIGS. 20 and 22. The boss on the piston 334 carries a pivot 336, and that pivot will move with that piston.

The numeral 312 denotes a boss on the casting which rests upon the framework 320 shown in FIG. 20, and that boss has an opening which accommodates a pivot 314. The opening is comparable to the opening 104 in the casting 86 of FIG. 6; and the pivot 314 is comparable to the pivot 124 disposed within the opening 104. A pair of L-shaped plates 338 have openings which accommodate the pivots 314 and 336, and those openings are adjacent the opposite ends of those plates. The plates 338 differ in configuration from the plates 120 and 122 of FIGS. 13 and 14, but they serve the same purpose that the plates 120 and 122 serve. The plates 338 carry a pivot 340, and that pivot rotatably supports a hub 342. A rod 344 extends downwardly from the hub 342, and it bears a cam 346 at the lower end thereof. The hub 342, the rod 344 and the cam 346 are comparable to the hub 128, the rod 138, and the cam 140 of FIGS. 13 and 14. FIG. 20 shows just one sleeve-like portion 302, just one clamp 304, just one piston 334, and just one cylinder 328 to operate the clamp 304; but a second sleeve-like portion 302, a second clamp 304, a second piston 334 and a second cylinder 328 are provided adjacent the other end of the container 301. As a result, the two pistons 334 can act through the two pairs of levers 338 and rods 344 to force both of the clamps 304 into clamping engagement with the sleeve-like portions 302, or to free those clamps from those sleeve-like portions.

In the released position shown by FIG. 20, the rod 344 is inclined to the left of the straight line that extends between the pivots 314 and 340. As the piston 334 is moved outwardly by compressed air supplied to the hose 332, the straight line connecting the pivots 314 and 340 and the axis of the rod 344 will move toward each other, and the hook 310 of the clamp 304 will be forced to move downwardly. In this way, the lining 306 of the clamp 304 will be forced into intimate and braking engagement with the external groove in the sleeve-like portion 302. The forces which can be applied by the piston 334 and the cylinder 328 are much greater than the forces which can be applied by manual manipulation of the sleeves 144 of FIGS. 13 and 14. For this reason, the clamp 304 and the sleeve-like portion 302 can clamp and hold containers that are larger and heavier than the container 166.

The numeral 360 denotes an arcuate flange which is provided on the periphery of the container 301 adjacent one end of that container, and that flange projects radially outwardly beyond the periphery of that container. A rack segment 362, comparable to the rack segment 192, is fixedly secured to one side of the flange 360 by fasteners 361, shown as screws. As indicated by FIG. 21, the teeth of that rack segment project radially outwardly beyond the flange 360.

The numeral 364 denotes a pivot bracket which is secured to a housing 366 that is comparable to the housing 60; and that housing encloses the motor and the variable speed drive for the polishing device of FIGS. 20–25. The pivot bracket 364 has two upstanding side walls, and those side walls have openings which support a pivot 368. The housing 366 also supports two pivot brackets 370; but those pivot brackets are closer to the top of the housing 366 than is the pivot bracket 364. The pivot brackets 370 are spaced along the length of the housing 366, as shown by FIG. 22; and they fixedly support an elongated cylindrical bar 372 which serves as a pivot.

A motor-supporting platform 374 is equipped with downwardly-extending pivot blocks 376, as shown by FIG. 22, and those pivot blocks have openings through which the elongated bar 372 can extend. The pivot blocks 376 coact with the elongated bar 372 to permit the platform 374 to be tilted relative to the housing 366. A motor 378 is fixedly secured to the platform 374, and that motor will tilt with that platform.

The numeral 380 denotes the shaft of the motor 378, and that shaft extends into the right-hand end of a coupling 381. A stub shaft 383 is held by the left-hand end of the coupling 381, and that stub shaft extends axially-outwardly beyond that coupling. A pinion 382 is fixedly secured to the stub shaft 383; and the coupling 381 causes the pinion 382 to rotate with the shaft 380 of the motor 378. The pinion 382 has teeth which are formed to mesh with the teeth on the rack segment 362.

A protective guard 384 is secured to the platform 374, and that guard overlies the upper portion of the pinion 382. That guard has, however, been removed from FIG. 22 to facilitate a clearer showing of the components of the polishing device provided by the present invention. That guard extends toward but terminates short of the rack segment 362, so it can keep fingers from engaging the pinion 382 and yet will not strike any of the teeth of the rack segment 362.

The numeral 386 denotes a pivot block which is located at the top of a vertically-directed support that is shown in detail in FIG. 23. That support is U-shaped in plan view, and it is preferably bent from a stiff metal plate. The bottom of the support 387 is secured to the supporting structure to which the pedestals of the polishing device of FIGS. 20–26 are secured. In addition, one side of the support 387 is secured to the housing 366; and in these ways, the support 387 is solidly and rigidly held in position. A bent plate 390 is welded or otherwise secured to the support 387; and that plate supports an adjustable stop 392, which is shown in the form of a machine screw. A nut 391 can be used to lock the adjustable stop 392 in adjusted position.

The numeral 388 denotes a pivot which is held by the pivot block 386 at the top of the support 387, and that pivot rotatably supports the lower ends of a pair of links 394. A thick link 396 has its upper end rotatably secured to a yoke-like pivot bracket 389 on the platform 374 by a pivot 398. The link 396 has its lower end disposed between the upper ends of the links 394, and a yoke on the end of a piston 406 has its arms disposed outwardly of the links 394. A pin 408 extends through alined openings in the arms of the yoke of piston 406, through openings in the upper ends of the links 394, and through an opening in the lower end of link 396 to interconnect piston 406 with the links 394 and 396.

The piston 406 is slidably disposed within a cylinder 400, and the closed end of that cylinder is rotatably secured to the bracket 364 by the pivot 368. A hose 402 can conduct compressed air to the cylinder 400 to cause extension of the piston 406, and a hose 404 can conduct compressed air to the other end of that cylinder to cause retraction of that piston. When the piston 406 is moved to extended position, as shown by FIG. 21, the links 396 and 394 interact to raise the right-hand end of the motor platform 374, thereby forcing the teeth of the pinion 382 into meshing engagement with the teeth of the rack segment 362. When the piston 306 is moved to retracted position, the links 394 and 396 will subtend a sharper angle between them and will lower the right-hand edge of the motor platform 374. At such time, the teeth of the pinion 382 will be moved out of engagement with the teeth on the rack segment 362. The adjustable stop 392 is in the path of one of the links 394 and will limit the counter clockwise rotation of that link. In doing so, that adjustable stop will limit the extent to which the pinion 382 can be moved away from the rack segment 362.

Referring to FIG. 24, the numeral 414 denotes a four-way, solenoid-operated, spring-return air valve. A pipe 416 connects that air valve to a source of compressed air, and a pipe 418 connects that valve to the adjacent atmosphere. A pipe 424 extends between one of the outlet ports of the valve 414 and one of the ports of a T-junction 426; and the remaining ports of that T-junction are connected to the cylinders 328 and to the cylinder 400 by the hoses 330 and 402, respectively. A pipe 420 extends from another of the outlet ports of the valve 414 to one of the ports of a T-junction 422; and the remaining ports of that T-junction are connected to the cylinders 328 and to the cylinder 400 by the hoses 332 and 404, respectively.

When the movable element of the valve 414 is in one of its two positions, the pipe 420 will be connected to the pipe 416; and the pipe 424 will be connected to the pipe 418. At such time, compressed air from the pipe 416 will be supplied to the hoses 332 and 404; and the compressed air in hose 404 will cause the cylinder 400 to move the piston 406 to the left and thereby cause the platform 374 to rotate in the clockwise direction and move the pinion 382 out of meshing engagement with the rack segment 362. The compressed air in the hoses 332 will cause the cylinders 328 to extend the pistons 334, thereby causing the L-shaped levers 338 to rotate in the counter clockwise direction to cause the rods 344 to force the clamps 304 into intimate and braking engagement with the sleeve-like portions 302 of the castings on the end walls of the container 301. These movements of pistons 406 and 334 were facilitated by the connecting of the pipe 424 to the pipe 418, because the air moved by those pistons could vent to the atmosphere. As a result, whenever the movable element of the valve 414 is in its said one position, the container 301 will be fixedly held against tilting and the pinion 382 will be out of engagement with the rack segment 362.

When the movable element of the valve 414 is in the other of its two positions, the pipe 424 will be connected to the pipe 416; and the pipe 420 will be connected to the pipe 418. At such time, compressed air from the pipe 416 will be supplied to the hoses 330 and 402; and the compressed air in the hose 402 will enable the cylinder 400 to move the piston 406 to the position shown in FIG. 21, thereby rotating the platform in the counterclockwise direction and moving the teeth on the pinion 382 into meshing engagement with the teeth on the rack segment 362. The compressed air in the hoses 330 will enable the cylinders 328 to move the pistons 334 to the retracted position shown in FIG. 20; and at such time the rods 344 will be moved downwardly and will release the holding forces on the clamps 304. These movements of pistons 406 and 334 were facilitated by the connecting of the pipe 420 to the pipe 418, because the air moved by those pistons could vent to the atmosphere. As a result, whenever the movable element of the valve 414 is in its said other position, the container 301 is free to be tilted and the pinion 382 is in meshing engagement with the rack segment 362. The movable element of the valve is normally in its said one position and is in its said other position only when the solenoid of that valve is energized.

Referring to FIG. 25, the numeral 430 denotes a conductor which is connected between one side of line and one of the normally-closed contacts of a double-throw push button 438. The other normally-closed contact of that push button is connected to one of the normally-closed contacts of a double-throw push button 434 by a conductor 442. The other normally-closed contact of the push button 434 is connected to the motor, that is disposed within the housing 366, by a conductor 432. A pair of conductors 436 are connected to the two normally-open contacts of the push button 434, and those conductors are connected to the motor 378 in such a way that when the push button 434 is pressed the motor 378 will drive the container 301 toward its upright position. Those conductors are also connected to a relay that can energize the solenoid of valve 414. The conductors 440 are connected to the two normally-open contacts of the push button 438, and those conductors are connected to the motor 378 in such a way that when the push button 438 is pressed the motor 378 will drive the container 301 toward its emptying position. Those conductors also are connected to a second relay that can energize the solenoid of the valve 414.

As shown by FIG. 25, the normally-closed contacts of the push buttons 434 and 438 are arranged so they normally complete a circuit between the conductors 430 and 432 and so they normally isolate the conductors 440 from each other and normally isolate the conductors 436 from each other. As long as the push buttons 434 and 438 are in their normal positions, it is possible to energize the motor within the housing 366 and thereby effect vibration of the container 301. However, as soon as either of those push buttons is pressed, the circuit to the motor within the housing 366 is broken and that motor cannot be energized.

Whenever it is desired to shift the container 301 from its upright position to its emptying position, the push button 438 is pressed. Thereupon, two circuits will be completed. One circuit will actuate the relay connected to the conductors 440 and will thereby energize the solenoid of the valve 414, and the other circuit will start the motor 378 rotating in such a direction as will cause the container 301 to move toward emptying position. As the solenoid of the valve 414 becomes energized, compressed air will be permitted to enter the hoses 330 and 402. The compressed air in the hoses 330 will cause the clamps 304 to move the releasing position, and the compressed air in the hose 402 will cause the pinion 382 to move into meshing engagement with the rack segment 362; and, as a result, the pinion 382 and the rack segment 362 will tilt the container 301 toward its dumping position. As the container 301 approaches its dumping position, the pressure on the push button 438 will be released; and thereupon that push button will return to the position shown by FIG. 25. At such time, the motor 378 will become de-energized, and the solenoid valve 414 will resume its normal position; thereby connecting the pipe 420 to the pipe 416 and connecting the pipe 424 to the pipe 418. The connecting of the pipe 420 to the pipe 416 will supply compressed air to the hoses 332 and 404; and the compressed air in the hoses 332 will force the pistons 334 to extended position and thereby cause the rods 344 to force the clamps 304 down into intimate and braking engagement with the sleeve-like portions 302, and the compressed air in the hose 404 will enable the cylinder 400 to cause the piston 406 to move to retracted position and thereby move the pinion 382 out of engagement with the rack segment 362.

The releasing of the push button 438 also restored the circuit to the motor in the housing 366; thereby facilitating the energization of that motor. The motor will be energized to apply vibrations to the tilted container 301 to facilitate emptying of that container and to vibrate the screen frame 206 which underlies the opening of that container. As a result, the contents of the tilted container 301 will promptly move onto the porous surface 210 and be separated. The polishing material will fall downwardly into a chip box 228 and the polished articles will work their way down the length of the porous surface 210 and fall into a tote box 230.

When it is desired to return the container 301 to its upright position, the push button 434 will be pressed. Thereupon, two circuits will be completed. One circuit will actuate the relay connected to the conductors 436 and will thereby energize the solenoid of the valve 414, and the other circuit will start the motor 378 rotating in such a direction as will cause the container 301 to move toward its upright position. As the solenoid of the valve 414 becomes energized, compressed air will be permitted to enter the hoses 330 and 402. The compressed air in the hose 402 will cause the pinion 382 to move into meshing engagement with the rack segment 362, and the compressed air in the hoses 330 will cause the clamps 304 to move to releasing position; and, as a result, the pinion 382 and the rack segment 362 will tilt the container 301 toward its upright position. As the container 301 approaches its upright position, the pressure on the push button 434 will be released; and thereupon that push button will return to the position shown by FIG. 26. At such time, the motor 378 will become de-energized, and the valve 414 will resume its normal position; thereby connecting the pipe 420 to the pipe 416 and connecting the pipe 424 to the pipe 418. The connecting of the pipe 420 to the pipe 416 will supply compressed air to the hoses 332 and 404; and the compressed air in the hoses 332 will force the pistons 334 to extended position and thereby cause the rods 344 to force the clamps 304 down into intimate and braking engagement with the sleeve-like portions 302, and the compressed air in the hose 404 will enable the cylinder 400 to move the piston 406 to retracted position and thereby move the pinion 382 out of engagement with the rack segment 362.

The circuit of FIG. 25 provides an interlock that prevents vibration of the vibratable frame of the polishing device of FIGS. 20-25 whenever the pinion 382 is in engagement with the rack segment 362. This is desirable because it prevents injury to the teeth of that pinion and rack segment and because it prevents injury to the shaft and bearings of the motor 378.

The variable speed drives that are diposed within the housings 60 and 366 are desirable because they make it possible to vary the frequencies of the vibrations imparted to the containers 166 and 301. It is also possible, with the vibration-imparting mechanisms of the said Lewis E. Soldan patent to vary the amplitudes of those vibrations. As a result, the polishing devices provided by the present invention are very versatile and effective.

It would be desirable to be able to adjust the inclination of the screen frame 206, because such adjustment would make it possible to regulate the rate at which the polished articles would work their way along the length of the porous surface 210 held by that screen frame. Yet, it is important that the said screen frame have a position in which it can be fixedly locked relative to the vibratable frame of the polishing device provided by the present invention. The present invention meets these two requirements by making the casing portions 54 adjustable relative to the pedestals 48; and that adjustment is easily effected by loosening the bolts, not shown, that hold the complementary caps, not shown, of those pedestals. Those bolts and complementary caps are shown in detail in the said Lewis E. Soldan patent.

Consequently, it is possible, with the polishing device of the present invention, to adjust the circumferential position of the vibratable frame of that polishing device and thereby adjust the inclination of the screen frame 206. Once the desired circumferential position of the vibratable frame has been attained, the bolts that hold the complementary caps of the pedestals will be tightened to maintain that circumferential position. At such time, the container 166 or 301 can be suitably tilted to make sure that it is squarely in its upright position. This means that optimum operation of both the porous surface 210 and the container 166 or 301 can be attained.

While the vibratable frames of the polishing devices provided by the present invention can have their circumferential positions adjusted relative to the pedestals 48, those vibratable frames are not tilted during the operation of those polishing devices. Instead, only the containers of those polishing devices are tilted during the operation of those devices. Consequently, the vibratable frames can correctly be considered to be non-tilting.

The castings 150 of FIGS. 1-19, and the corresponding castings of FIGS. 20-23, have their geometric centers adjacent the geometric centers of the end walls of the containers 166 and 301, respectively. Further, the container 166 or the container 301 will usually be almost completely full when it is being vibrated or when it is being tilted toward emptying position. As a result, the center of rotation and the center of mass of the container 166 or of the container 301 will be almost coincident. This is desirable because it minimizes the forces needed to hold those containers in upright or tilted position and it minimizes the forces needed to tilt those containers toward and away from emptying position.

The polishing device of FIGS. 20-23 has a manually-driven rack segment, not shown, in addition to the power-driven rack segment 362; but that manually-driven rack segment will not be used during the normal operation of the polishing device of the present invention. Only when the motor 378 or its control equipment breaks down will that manually-driven rack be used. In the event of such a breakdown, the pinion 382 will be removed from the stub shaft 383 so the motor 378 can be tilted toward and away from the rack segment 362 without interfering with manual rotation of the container 301.

Whereas the drawing and accompanying description have shown and described two preferred embodiments of the present invention it should be apparent to those skilled in the art that various changes may be made in the form of the invention without affecting the scope thereof.

What I claim is:

1. A polishing device which comprises supporting members, a vibratable frame, said supporting members holding said vibratable frame substantially stationary throughout any given polishing and discharging cycles of said polishing device while permitting said vibratable frame to vibrate relative to said supporting members during said polishing and discharging cycles, a vibration-imparting mechanism that can impart vibrations to said vibratable frame throughout said polishing and discharging cycles of said polishing device, a container for polishing material and for articles to be polished, a support that is carried by said vibratable frame and that supports said container, said support being non-resiliently secure to said vibratable frame and normally non-resiliently holding said container so vibrations will be transmitted without substantial diminution from said vibratable frame to said support and will then be transmitted without substantial diminution from said support to said container, said support selectively permitting tilting of said container, relative to said vibratable frame and relative to said support, from its normal polishing position to an emptying position to permit emptying of said container, a porous cover for said container that is bodily securable to and bodily separable from said container, an elongated pipe that is carried by and that extends along said porous cover and that can direct liquid into said container whenever said porous cover is bodily secured to said container, said pipe having the opposite ends thereof threaded to selectively receive a cap or a hose, said pipe being adjacent one edge of said porous cover and having a plurality of openings therein that are spaced along the length thereof, and clamps that releasably secure said porous cover to said container.

2. A polishing device which comprises supporting members, a vibratable frame, said supporting members holding said vibratable frame substantially stationary throughout any given polishing and discharging cycles of said polishing device while permitting said vibratable frame to vibrate relative to said supporting members during said polishing and discharging cycles, a vibration-imparting mechanism that can impart vibrations to said vibratable frame throughout said polishing and discharging cycles of said polishing device, a container for polishing material and for articles to be polished, a support that is carried by said vibratable frame and that supports said container, said support being non-resiliently secured to said vibratable frame and normally non-resiliently holding said container so vibrations will be transmitted without substantial diminution from said vibratable frame to said support and will then be transmitted without substantial diminution from said support to said container, said support selectively permitting tilting of said container, relative to said vibratable frame and relative to said support, from its normal polishing position to an emptying position to permit emptying of said container, a porous cover for said container that is bodily securable to and bodily separable from said container, an elongated pipe that is carried by and that extends along said porous cover and that can direct liquid into said container whenever said porous cover is bodily secured to said container, said pipe having a plurality of openings therein that are spaced along the length thereof, and clamps that releasably secure said porous cover to said container.

3. A polishing device which comprises a vibratable frame that is held substantially stationary throughout any given polishing and discharging cycles of said polishing device while being free to vibrate, a vibration-imparting mechanism that can impart vibrations to said vibratable frame throughout said polishing and discharging cycles of said polishing device, a container for polishing material and for articles to be polished, a support that is carried by said vibratable frame and that supports said container, said support being non-resiliently secured to said vibratable frame and normally non-resiliently holding said container so vibrations will be transmitted without substantial diminution from said vibratable frame to said support and will then be transmitted without substantial diminution from said support to said container, said support selectively permitting tilting of said container, relative to said vibratable frame and relative to said support, from its normal polishing position to an emptying position to permit emptying of said container, a porous cover for said container, a nozzle that can direct liquid into said container, said nozzle being adjacent one edge of said porous cover, and clamps that releasably secure said porous cover to said container, said nozzle being adapted to direct water into said container and said porous cover being adapted to permit water to drain out of said container while said container is in the emptying position and is being vibrated.

4. A polishing device which comprises a vibratable frame that is held substantially stationary throughout any given polishing and discharging cycles of said polishing device while being free to vibrate, a vibration-imparting mechanism that imparts vibrations to said vibratable frame, a container for polishing material and for articles to be polished, and a support that is carried by said vibratable frame and that supports said container, said support being non-resiliently secured to said vibratable frame and normally non-resiliently holding said container so vibrations will be transmitted without substantial diminution from said vibratable frame to said support and will then be transmitted without substantial diminution from said support to said container, said support selectively permitting tilting of said container, relative to said vibratable frame and relative to said support, from its normal polishing position to an emptying position to permit emptying of said container, said support including an arcuate clamp that is selectively movable into clamping position to prevent tilting movement of said container and that is selectively movable out of said clamping position to permit tilting movement of said container.

5. In a polishing device which has a non-tilting vibratable frame, a vibration-imparting mechanism that imparts vibrations to said frame, and a container for polishing material and for articles to be polished, the improvement which comprises a support that is carried by said frame and that supports said container, said container normally being held against tilting relative to said frame but being selectively tiltable relative to said frame for movement from a charging position to an emptying position, said container having a cylindrical surface thereon, and an arcuate clamp that is selectively movable into engagement with said cylindrical surface on said container to prevent tilting movement of said container and that is selectively movable out of engagement with said cylindrical surface on said container to permit tilting movement of said container, said arcuate clamp having a lining that is sturdy and that has a good coefficient of friction.

6. In a polishing device which has a non-tilting vibratable frame, a vibration-imparting mechanism that imparts vibrations to said frame, and a container for polishing material and for articles to be polished, the improvement which comprises a support that is carried by said frame and that has an arcuate surface, a plurality of rotatable members that are carried by said support adjacent said arcuate surface and that rotate relative to said support, and an arcuate member on said container that rests upon and is supported by said rotatable members, said rotatable members facilitating the tilting of said container to emptying position.

7. In a polishing device which has a non-tilting vibratable frame, a vibration-imparting mechanism that imparts vibrations to said frame, and a container for polishing material and for articles to be polished, the improvement which comprises a support that is carried by said frame and that has an arcuate surface, a plurality of rotatable members that are carried by said support adjacent said arcuate surface and that rotate relative to said support, and an arcuate member on said container that rests upon and is supported by said rotatable members, said rotatable members facilitating the tilting of said container to emptying position, said rotatable members coacting with said arcuate member on said container to prevent appreciable sideways or endways movement of said container but to permit lifting of said container out of engagement with said support.

8. In a polishing device which has a non-tilting vibratable frame, a vibration-imparting mechanism that imparts vibrations to said frame, and a container for polishing material and for articles to be polished, the improvement which comprises a support that is carried by said frame, a plurality of rotatable members that are carried by said support and that rotate relative to said support, an arcuate member on said container that rests upon and is supported by said rotatable members, said rotatable members facilitating the tilting of said container to emptying position, and a clamp that selectively engages said arcuate surface on said container to prevent tilting of said container.

9. In a polishing device which has a non-tilting vibratable frame, a vibration-imparting mechanism that imparts vibrations to said frame, and a container for polishing material and for articles to be polished, the improvement which comprises a support that is carried by said frame, a plurality of rotatable members that are carried by said support and that rotate relative to said support, an arcuate member on said container that rests upon and is supported by said rotatable members, said rotatable members facilitating the tilting of said container to emptying position, and a clamp that selectively engages said arcuate surface on said container to prevent tilting of said container, said rotatable members underlying said arcuate surface on said container and said clamp overlying said arcuate surface on said container, said arcuate surface on said container being cylindrical.

10. In a polishing device which has a container, a vibratable frame, and a vibration-imparting mechanism that imparts vibrations to said vibratable frame, a support that is carried by said vibratable frame and that rotatably supports said container, a rack that is carried by said container, and a pinion that is selectively engageable with said rack to rotate said container toward and away from emptying position, said pinion being separable from said rack whenever said vibration-imparting mechanism imparts vibrations to said container via said vibratable frame and said support so said pinion and rack will not be vibratable frame and said support so said pinion and rack will not be vibrated in engagement with each other.

11. In a polishing device which has a vibratable frame, a vibration-imparting mechanism that imparts vibrations to said vibratable frame, and a container for polishing material and for articles to be polished, a support that is carried by said frame and that supports said container, said support normally holding said container against tilting movement relative to said vibratable frame but selectively permitting said container to be tilted relative to said vibratable frame, a separating screen that is separate from and independent of said container, and interacting surfaces on said separating screen and on said vibratable frame that selectively secure said separating screen to, and release said separating screen from, said vibratable frame, said separating screen being adapted to underlie the outlet of said container whenever said container is in emptying position and being adapted to respond to vibration of said vibratable frame to vibrate and cause polishing material to pass through it while forcing polished articles to work their way along the length thereof and fall off the end thereof.

12. In a polishing device which has a container and a vibration-imparting mechanism that imparts vibrations to said container, said container having portions that define a charging and discharging opening for said container, a flange on said container that extends outwardly from said opening, a plurality of slots in said flange, a cover for said opening in said container that can overlie and close said opening and can overlie said flange, slots in said cover that are registerable with said slots in said flange, pivot brackets on said cover adjacent said slots in said cover, rods that are selectively disposable in said slots in said flange and in said cover and that have laterally-extending portions adjacent the lower ends thereof that are wider than said slots in said flange and that underlie those areas of said flange that define said slots in said flange, and eccentric members that are rotatably supported by said pivot brackets on said cover and that are rotatably secured to said rods, said eccentric members being rotatable to pull said laterally-extending portions of said rods into clamping engagement with said areas of said flange that define said slots in said flange and thereby secure said cover to said container.

13. In a polishing device which has a container and a vibration-imparting mechanism that imparts vibrations to said container, said container having portions that define a charging and discharging opening for said container, a flange on said container that extends outwardly from said opening, a cover for said opening in said container that can overlie said opening and can overlie said flange, and a lining for said container that covers the interior of said container and that extends outwardly from said opening in said container and is bent over onto said flange, said lining being resilient and serving as a gasket between said cover and said flange and providing a continuous and uninterrupted seal for said container.

14. In a polishing device which has a vibratable frame, a support for said frame, and a container, the improvement which comprises interacting surfaces that rotatably hold said vibratable frame relative to said support and that can permit the circumferential position of said vibratable frame to be adjusted relative to said support, a porous screen that is securable to said vibratable frame and that is vibratable with said vibratable frame, the inclination of said porous screen being adjusted when the circumferential position of said vibratable frame is adjusted, and further interacting surfaces that rotatably hold said container relative to said vibratable frame and that can permit the position of said container relative to said vibratable frame to be adjusted, whereby the optimum inclination of said porous screen can be attained and the optimum setting of said container can also be attained.

15. In a polishing device which has a vibratable frame, a container, and a support that is carried by said vibratable frame and that holds said container, said container having an arcuate side and an arcuate bottom that coact to define a continuous and uninterrupted arcuate surface of greater than one hundred and eighty degrees extent for the interior of said container, said container having a substantially flat side that is generally tangential to said arcuate bottom, the upper edges of said sides coacting to define a charging and discharging opening for said container, said support normally holding said container with the opening therein up but selectively permitting said container to tilt to a position where said flat side inclines downwardly to serve as a slide for the contents of said container and said opening permits discharging of the contents of said container.

16. In a polishing device which has a vibratable frame and a container, said container having an arcuate side and an arcuate bottom that coact to define a continuous and uninterrupted arcuate surface for the interior of said container, said container having a substantially flat side that is generally tangential to said arcuate bottom, the upper edges of said sides coacting to define a charging and discharging opening for said container, said container normally having the opening therein up but selectively tilting to a position where said flat side inclines downwardly to serve as a slide for the contents of said container and said opening permits discharging of the contents of said container.

17. A polishing device which comprises supporting members, a vibratable frame, said supporting members holding said vibratable frame substantially stationary throughout any given polishing cycle of said polishing device while permitting said vibratable frame to vibrate relative to said supporting members during said polishing cycle, a vibration-imparting mechanism that imparts vibrations to said vibratable frame during said polishing cycles of said polishing device, a container for polishing material and for articles to be polished, a support that is carried by said vibratable frame and that supports said container, said container having an axis about which it can be rotated relative to said vibratable frame, and interacting surfaces on said container and on said support that guide and confine said container for rotation about said axis relative to said frame while holding said container in assembled relation with said support, said support being non-resiliently secured to said vibratable frame and said interacting surfaces normally non-resiliently holding said container relative to said support so vibrations will be transmitted without substantial diminution from said vibratable frame to said support and will then be transmitted without substantial diminution from said support to said container, and clamp means engaging said guide surfaces on said container and normally holding said container in upright position relative to said vibratable frame, said means selectively permitting rotation of said container about said axis relative to said vibratable frame from its normal polishing position to an emptying position to permit emptying of said container.

18. A polishing device as claimed in claim 17 wherein said means includes a clamp that is selectively movable into clamping position to prevent rotation of said container from its upright position to its emptying position, said clamp being selectively movable into a position close to clamping position to apply braking forces to said container which will regulate and control the rate at which said container is rotated from its upright position to its emptying position.

19. In a polishing device which has a non-tilting vibratable frame, a vibration-imparting mechanism that imparts vibrations to said frame, and a container for polishing material and for articles to be polished, the improvement which comprises a support that is carried by said frame and that supports said container, said container having an axis about which it can be tilted relative to said frame, surfaces on said support and on said container that interact to guide and confine said container for rotation relative to said frame from an upright position to a tilted position while keeping said container and said support in assembled relation, and a clamp engaging said guide surfaces on said container that is selectively movable into clamping position to prevent rotation of said container relative to said frame and that is selectively movable out of clamping position to permit said container to be rotated from upright position to emptying position, said clamp normally holding said container in upright position relative to said frame but selectively permitting said container to be rotated into its emptying position, said clamp being selectively movable wholly out of the path of said container to enable said container to be bodily separated from said support and said frame.

20. A polishing device as claimed in claim 17 wherein said interacting surfaces hold said container non-resiliently relative to said support when said container is in said emptying position and wherein said vibration-imparting mechanism is operable to impart vibrations to said support and to said container while said container is in said emptying position, whereby vibrations of substantially undiminished amplitude can be applied to said container while said container is in said emptying position to facilitate emptying of said container.

References Cited by the Examiner

UNITED STATES PATENTS

| | | | |
|---|---|---|---|
| 1,787,788 | 1/1931 | Kuenenman | 241—38 |
| 1,908,104 | 5/1933 | Bell | 51—163 |
| 1,926,135 | 9/1933 | Beckett | 51—6 |
| 1,933,764 | 11/1933 | Ruth | 241—171 |
| 1,997,400 | 4/1935 | Wysocki | 259—75 |
| 2,238,711 | 4/1941 | Soldan | 209—326 |
| 2,284,548 | 5/1942 | Wood | 241—171 |
| 2,425,984 | 8/1947 | Blackman | 134—7 |
| 2,471,433 | 5/1949 | Kahn | 68—23 |
| 2,898,711 | 8/1959 | Kilbane et al. | 51—164 |
| 2,973,606 | 3/1961 | Brandt | 51—163 |
| 2,997,813 | 8/1961 | Brandt | 51—7 |
| 2,997,814 | 8/1961 | Brandt | 51—7 |

FOREIGN PATENTS 389,544   7/1908   France.

HAROLD D. WHITEHEAD, *Primary Examiner.*

J. SPENCER OVERHOLSER, *Examiner.*

J. L. TATE, *Assistant Examiner.*